United States Patent
Basehore et al.

(10) Patent No.: US 11,355,944 B2
(45) Date of Patent: Jun. 7, 2022

(54) PREDICTIVE CHARGING TO REDUCE BATTERY CAPACITY DEGRADATION

(71) Applicant: GOOGLE LLC, Mountain View, CA (US)

(72) Inventors: Derek Basehore, Menlo Park, CA (US); Andrew Rossignol, Mountain View, CA (US); Nicholas Jordan Sanders, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 267 days.

(21) Appl. No.: 16/719,279

(22) Filed: Dec. 18, 2019

(65) Prior Publication Data

US 2021/0152004 A1    May 20, 2021

Related U.S. Application Data

(60) Provisional application No. 62/936,039, filed on Nov. 15, 2019.

(51) Int. Cl.
*H02J 7/00* (2006.01)
(52) U.S. Cl.
CPC ........ *H02J 7/0069* (2020.01); *H02J 7/00036* (2020.01); *H02J 7/0071* (2020.01)
(58) Field of Classification Search
USPC ....................................................... 320/135
See application file for complete search history.

(56) References Cited

U.S. PATENT DOCUMENTS

| | | | | |
|---|---|---|---|---|
| 5,237,259 A | * | 8/1993 | Sanpei ................ | H02J 7/00714 320/158 |
| 6,107,782 A | * | 8/2000 | Imai ...................... | H01M 10/44 320/150 |
| 6,275,006 B1 | * | 8/2001 | Koike ................... | H02J 7/0071 320/125 |
| 8,310,205 B1 | * | 11/2012 | Hamburgen ...... | H02J 7/007192 320/130 |
| 8,949,629 B2 | | 2/2015 | Chakra et al. | |

(Continued)

OTHER PUBLICATIONS

"iOS 13 iPhone features: What is Optimized Battery Charging?", 9to5Mac (https://9to5mac.com/2019/10/01/ios-13-phone-optimized-battery-charging), Oct. 1, 2019, 10 pages.

*Primary Examiner* — Samuel Berhanu
(74) *Attorney, Agent, or Firm* — Brake Hughes Bellermann LLP

(57) ABSTRACT

According to an aspect, a system includes a battery configured to be charged by a power source, a charging circuit coupled to the battery, and a battery charging manager configured to communicate with the charging circuit to control a charging of the battery by the power source. The battery charging manager obtains a charge pattern including an end charge time corresponding to a time when the battery is estimated to be disconnected from the power source. The battery charging manager controls the charging circuit to charge, over a first charging period, the battery to a temporary charge level, maintain, over a relaxation period, a battery charge level between the temporary charge level and a maintenance charge level, and charge, over a second charging period after the relaxation period, the battery to a maximum battery charge level before the end charge time.

22 Claims, 15 Drawing Sheets

(56) References Cited

U.S. PATENT DOCUMENTS

| | | | |
|---|---|---|---|
| 2013/0103960 A1 | 4/2013 | Alberth et al. | |
| 2014/0312839 A1* | 10/2014 | Uyeki | B60L 53/66 320/109 |
| 2015/0123595 A1 | 5/2015 | Hussain et al. | |
| 2015/0227445 A1 | 8/2015 | Arscott et al. | |
| 2017/0229891 A1* | 8/2017 | Lee | H02J 7/04 |

* cited by examiner

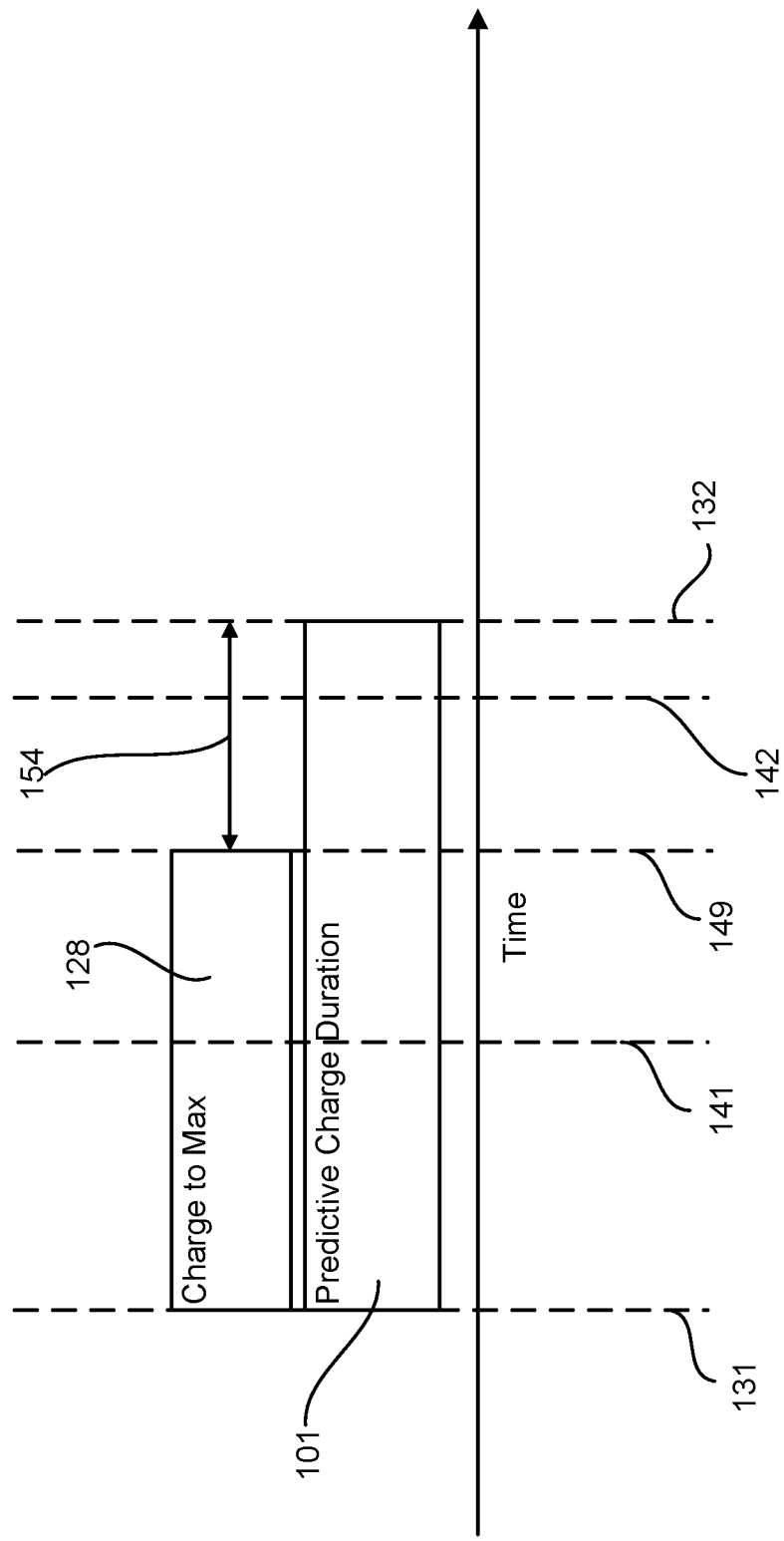

PREDICTIVE CHARGING TO REDUCE BATTERY CAPACITY DEGRADATION

CROSS REFERENCE TO RELATED APPLICATION

This application claims the benefit of U.S. Provisional Application No. 62/936,039, filed Nov. 15, 2019, the disclosure of which is incorporated by reference herein in its entirety.

TECHNICAL FIELD

This description relates to predictive charging to reduce battery capacity degradation.

BACKGROUND

Many devices use one or more batteries to provide power to the devices. In these devices, many of the batteries may be rechargeable batteries such as, for example, lithium-ion (Li-ion) batteries. To recharge the batteries, the device may be plugged into a power source such as, for example, AC mains, a car battery through a charging port in a car, or other power sources. When the device is connected to the power source, the batteries are typically charged to their full capacity. Always charging the rechargeable batteries to their full capacity (e.g., leaving the device and batteries connected to a power source) may cause the battery cells to experience a reduction of cell capacity and a shortened service life over time. As a result of the reduced capacity, the runtime of the devices that use these batteries becomes shorter and shorter.

SUMMARY

According to an aspect, a system includes a battery configured to be charged by a power source, a charging circuit coupled to the battery, and a battery charging manager configured to communicate with the charging circuit to control a charging of the battery by the power source. The battery charging manager obtains a charge pattern including an end charge time corresponding to a time when the battery is estimated to be disconnected from the power source. The battery charging manager controls the charging circuit to charge, over a first charging period, the battery to a temporary charge level, maintain, over a relaxation period, a battery charge level between the temporary charge level and a maintenance charge level, and charge, over a second charging period after the relaxation period, the battery to a maximum battery charge level before the end charge time. A corresponding method, computer program and non-transitory computer-readable medium are also provided.

According to some aspects, the system, method, computer program and/or non-transitory computer-readable medium may include one or more of the following features (or any combinations thereof). The battery charging manager may estimate a length of time to charge the battery to the maximum battery charge level, where the battery charging manager may control the charging circuit in response to the estimated length of time being less than a predicted charge duration. The battery charging manager may calculate a charge resume time and start the second charging period at the calculated charge resume time. The battery charging manager may calculate the charge resume time using the end charge time and an estimated time duration to charge the battery from the temporary charge level to the maximum battery charge level. The battery charging manager may adjust a value of the temporary charge level using a prediction confidence level associated with the charge pattern. The system may include an application controller, and an embedded controller, where the embedded controller includes the battery charging manager. The battery charging manager includes a prediction engine configured to compute the charge pattern, where the prediction engine includes a predictive model, and the prediction engine configured to obtain one or more signals and input the signals to the predictive model to compute the charge pattern. The signals include charging history data and/or contextual data. The prediction engine may compute the charge pattern before detection of a charging event and/or store the charge pattern in memory of the system, where the battery charging manager is configured to obtain the charge pattern from the memory in response to the detection of the charging event. The battery charging manager may cause the prediction engine to compute the charge pattern in response to a detection of a charging event. The battery charging manager may include a predictive model trainer configured to train the predictive model using one or more machine-learning algorithms inputted with training data, where the prediction engine is configured to execute on a device, and the predictive model trainer is configured to execute on a server computer. The prediction engine is configured to receive, over a network, information related to the predictive model from the predictive model trainer.

According to an aspect, a method includes computing a predictive charge pattern based on charging history data and contextual data, where the predictive charge pattern includes an end charge time corresponding to a time when a battery of a device is estimated to be disconnected from a power source, calculating a charge resume time using the charge pattern, and controlling a charging of the battery using the end charge time and the charge resume time. The controlling step includes charging, over a first charging period, the battery to a temporary charge level, maintaining, over a relaxation period, a battery charge level between the temporary charge level and a maintenance charge level, and charging, over a second charging period starting at the charge resume time, the battery to a maximum battery charge level before the end charge time. A corresponding system, computer program and non-transitory computer-readable medium are also provided.

According to some aspects, the system, method, computer program and/or non-transitory computer-readable medium may include one or more of the following features (or any combinations thereof). The method may include storing the charge pattern in memory of the device, obtaining the charge pattern in response to detection of a charging event of a current charge cycle, and determining that the current charge cycle relates to the charge pattern. The charge pattern may be computed in response to detection of a charging event. The method may include computing, by a predictive model, a value for the temporary charge level. The method may include estimating a length of time to charge the battery to the maximum battery charge level and controlling the charging of the battery in response to the estimated length of time being less than a predicted charge duration, where the predicted charge duration is defined from a time of detecting of a charging event to the end charge time. The method may include re-training the predictive model using one or more machine-learning algorithms inputted with training data to obtain updated weight and bias information and updating the predictive model with the updated weight and bias information.

According to an aspect, a non-transitory computer-readable medium storing executable instructions that when executed by a processor cause the processor to compute a charge pattern based on charging history data and contextual data, the charge pattern having a charge duration during which a device having a battery is estimated to be coupled to a power source, adjust a charging of the battery in response to the charge duration being greater than an estimated time to charge the battery to a maximum charge level, where the adjustment operation includes charge, over a first charging period, the battery to a temporary charge level, maintain, over a relaxation period, a battery charge level between the temporary charge level and a maintenance charge level, and charge, over a second charging period after the relaxation period, the battery towards the maximum battery charge level.

According to some aspects, the system, method, computer program and/or non-transitory computer-readable medium may include one or more of the following features (or any combinations thereof). The charge pattern includes an end charge time of when the battery is predicted to be disconnected from the power source, where the battery is charged to the maximum battery charge level before the end charge time during the second charging period. The operations may include increasing a value of the temporary charge level in response to a prediction confidential level being less than a threshold level, storing the charge pattern in memory, detecting a charging event, and/or obtaining the charge pattern from the memory.

The details of one or more implementations are set forth in the accompa-nying drawings and the description below. Other features will be apparent from the description and drawings, and from the claims.

BRIEF DESCRIPTION OF THE DRAWINGS

FIG. 1H illustrates a predicted charge duration and an estimated period of time to charge to a maximum charge level according to an aspect.

DETAILED DESCRIPTION

Figure 1A:
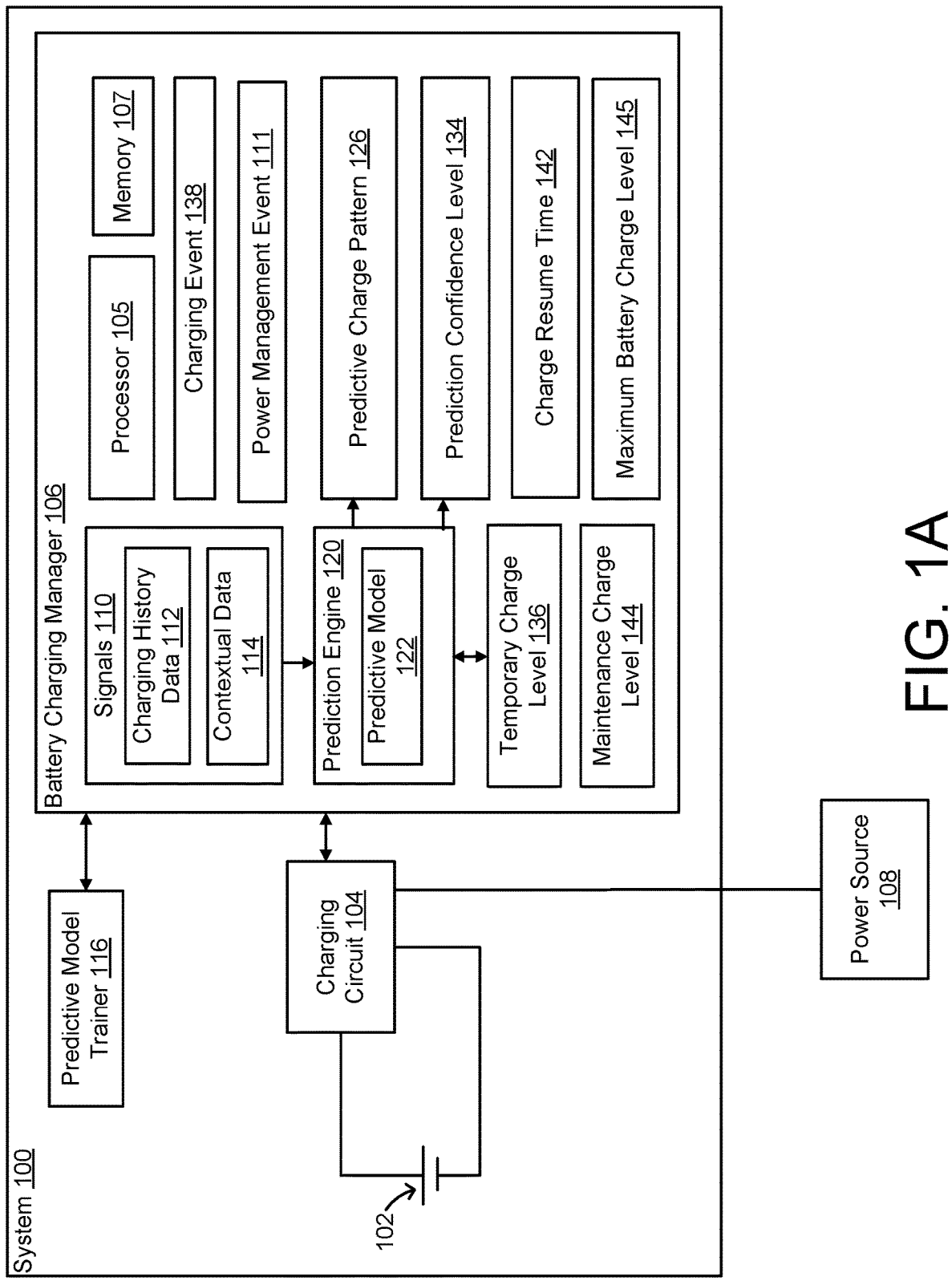
FIG. 1A illustrates a system for controlling a battery using a predictive charge pattern according to an aspect.

This document describes systems and techniques for reducing (or minimizing) the time a battery is spent at high charge states with little, if any, impact to available charge when the user is discharging the battery. For example, this document describes a system for predicting one or more charge patterns, e.g., when the system is predicted to be disconnected from (or connected to) a power source and controlling the charging of a battery using the predicted charge pattern(s) to reduce battery capacity degradation. Battery degradation may therefore be reduced, which can extend the service lifetime of the battery.

The system may include a prediction engine having a predictive model that can predict one or more charge patterns using one or more machine-learning algorithms. The prediction engine may obtain one or signals related to the charging activities of the battery/system, which may include signals related to, or associated with, information such as charging history data and contextual information (data) about the system and/or any other suitable signals. The prediction engine may then compute a predictive charge pattern based on the signals, which the predictive charge pattern may include a time (or time duration) which the battery (or the system including the battery) is predicted to be disconnected from the power source. Using the predictive charge pattern, a battery charging manager controls the charging of the battery to reduce battery capacity degradation according to an aspect. For example, the battery charging manager manages the charging of the battery using the predictive charge pattern to reduce the amount of time in which the battery charge level is at higher charge levels while reducing (or eliminating) the impact to the user of the system.

In some examples, the battery charging manager may adjust or alter the normal charging operation such that the amount of time in which (or for which) the charge level of the battery is at higher charge levels is reduced (e.g., minimized) while providing a battery charge level that is at (or close to) the maximum battery charge level at the time when the power source is predicted to be disconnected from the system. The technical effects of this approach include improving the battery capacity over time, since the amount of time spent at higher charge levels may be reduced and thus overall battery degradation is reduced. In addition, the technical effects includes reducing (or eliminating) the impact of the charging adjustment to the user by controlling the charging in a manner such that the battery charge level is close to or at the maximum battery charge level at the time when the system is predicted to be disconnected from the power source. Impact on the performance of the device may thus be reduced while at the same time benefits of improving battery service life may be provided. The approach described herein may also be more advantageous than merely adjusting the value of a continuous charge rate, since by maintaining the battery at or around a temporary charge level for a period of time, the total time spent by the battery at or near the maximum battery charge level is reduced.

FIGS. 1A through 1I illustrate various perspectives of a system 100 for predicting charge patterns of the system 100 (e.g., when the system is predicted to be disconnected from (or connected to) a power source 108) and controlling the charging of a battery 102 using the predicted charge patterns to reduce battery capacity degradation according to an aspect. The system 100 includes a battery charging manager 106, a charging circuit 104, and a predictive model trainer 116. A user may connect the power source 108 to the system 100 to enable charging of the battery 102 when the system 100 is implemented in a device that includes the battery 102, or a user may connect the power source 108 to the battery 102 of the system 100 (which may be at least partially implemented on a server computer remote from the battery 102 and the associated user device).

The predictive model trainer 116 may train a predictive model 122 using one or more machine-learning algorithms that can predict a charging pattern of the system 100. The battery charging manager 106 includes a prediction engine 120 that inputs one or more signals 110 to the predictive model 122 to compute a predictive charge pattern 126, where the predictive charge pattern 126 can predict (or estimate) when the system 100 will be disconnected (and/or connected) from/to the power source 108. The signals 110 may be signals related to or associated with charging activities of the system 100. The signals 110 may represent charging history data 112 (e.g., when and for how long a user connects and/or disconnects the power source 108, etc.) and contextual data 114 (e.g., time of day, a day of the week, a user's calendar information, etc.). In some examples, the predictive charge pattern 126 may be information that can predict discharge situations of the system 100 (e.g., when the system 100 is predicted to consume power from the battery 102). In some examples, the predictive charge pattern 126 includes one or more periods of time that the system 100 is used (e.g., draws power from the battery 102).

Using the predictive charge pattern 126, the battery charging manager 106 may manage the charging of the battery 102 to reduce the amount of time in which the battery charge level is at higher charge levels while reducing (or eliminating) the impact to the user of the system 100. Throughout this document, a battery 102 may be referred to as being charged to a percentage of full capacity, where capacity or full capacity means that the battery 102 is fully charged or has a maximum battery charge level 145. In some examples, the maximum battery charge level 145 is considered an upper battery charge level or a threshold battery charge level. The maximum battery charge level 145 may be used to mean a battery's capacity at that given instance in the life of the battery 102 given safety policies and battery wear. A percentage of full capacity means that the battery is charged to less than full capacity. The capacity of the battery 102 is the total amount of electrical charge a battery 102 is able to hold, where the capacity is usually expressed in ampere-hours (or milliampere-hours) or as watt-hours. The percentage of capacity also may be used interchangeably with state of charge (SoC), where the SoC for a rechargeable battery is the fraction, usually expressed as a percentage, of the total electrical energy stored in a battery 102 by charging that is still available for discharging at a certain point in time.

According to a normal charging operation, when the system 100 is connected to the power source 108, the battery 102 is charged at a charging rate until the charge level of the battery 102 is at the maximum battery charge level 145 (full capacity), and the battery 102 continues to remain (and/or continues to be charged) at the maximum battery charge level 145 until the power source 108 is disconnected from the system 100. In some examples, the increased amount of time spent at higher or maximum charge levels may cause battery capacity degradation over time. Previously known charging operations may therefore reduce battery service lifetime as compared to the approach described herein.

However, using the predictive charge pattern 126, the battery charging manager 106 may adjust or alter the normal charging operation such that the amount of time in which the charge level of the battery 102 is at higher charge levels (including the maximum battery charge level 145) is reduced while providing a battery charge level that is at (or close to) the maximum battery charge level 145 at the time when the power source 108 is predicted to be disconnected from the system 100. As a result, the battery capacity degradation may be reduced over time since the amount of time spent at higher charge levels may be reduced.

Also, the techniques described herein may lessen (or eliminate) the impact of the charging adjustment to the user by controlling the charging in a manner such that the battery charge level is close to or at the maximum battery charge level 145 at the time when the system 100 is predicted to be disconnected from the power source 108. In some examples, while the system 100 is connected to the power source 108, the battery charging manager 106 may pause the charging of the battery 102 for one or more periods of time (e.g., one or more "relaxation periods"), but then resume the charging of the battery 102 in a second charging period before the time in which the power source 108 is predicted to be disconnected from the system 100. In some examples, the battery charging manager 106 may adjust the charging rate (e.g., the rate at which the battery 102 is charged) for one or more periods of time. By providing a varying charging rate, for example with different charging rates for different periods of time, the total time spent by the battery 102 at or near the maximum battery charge level 145 may be reduced.

The system 100 may be implemented in a device (or multiple devices) that uses power from a battery 102 including, for example, a cell phone, a smart phone, a tablet device, a laptop computing device, a mobile computing device, a gaming device, a music device, an automobile (e.g., an electric car with a battery pack), an energy power pack (e.g., solar panels), utility scale battery packs, a scooter, a flashlight, an emergency lighting system, or any combinations of these devices or any type of device that uses a rechargeable battery. In some examples, one or more components of the system 100 are implemented in a user device, and one or more the system 100 are implemented in a server device (or computer) remote from the user device and communicatively coupled to the user device via a network. In some examples, one or more components of the battery charging manager 106 are implemented in an operating system of a computing device (which may be the user device described herein). In some examples, the functionalities of the battery charging manager 106 are included within an embedded controller that manages the embedded controls of the operating system.

The charging circuit 104 regulates the power being provided from the power source 108 to the battery 102. In some examples, the charging circuit 104 is included as part of the battery charging manager 106. In some examples, the charging circuit 104 is included as part of the battery 102. In some examples, the battery charging manager 106 and the charging circuit 104 are included as part of the battery 102. The charging circuit 104 is operably coupled to the battery 102 and to the battery charging manager 106. In some examples, the charging circuit 104 may be connected to one or more terminals of the battery 102. The charging circuit 104 may be an analog charging circuit, a digital charging circuit or a combination of an analog charging circuit and a digital charging circuit. In some examples, the charging circuit 104 may measure and provide information about the battery 102 to the battery charging manager 106 to compute the state of charge (or the charge level). In some examples, the charging circuit 104 may measure the battery voltage and provide the battery voltage to the battery charging manager 106 to compute the state of charge (e.g., the battery charge level).

The battery charging manager 106 may provide information to the charging circuit 104 to control the charging of the battery 102. In some examples, the battery charging manager 106 may generate signals to control the charging of the battery 102. In some examples, the battery charging manager 106 may provide charging control signals via a system management bus. In some examples, the battery charging manager 106 may provide charging control signals over a network, which are received by the charging circuit 104. In some examples, the battery charging manager 106 provides a percentage of capacity setpoint to indicate a percentage of capacity that the charging circuit 104 should charge the battery 102 (e.g., charge to a temporary charge level 136 (e.g., 70% of full capacity), charge to the maximum battery charge level 145 (e.g., 100% of full capacity), etc.). The setpoint may be a variable setpoint. The setpoint may be expressed in other measures as well, including a float voltage setpoint, which may equate to a certain percentage of charge.

The power source 108, which may be used to charge the battery 102, includes any type of power supply that is used to charge batteries. For example, the power source 108 may include AC mains through a power cord, a car battery through a power cord or a power supply from another device such as, for example, the power supply from a computer (e.g., a desktop computer or a laptop computer) through a cord such as a USB cable.

The battery 102 may include any type of rechargeable battery containing one or more battery cells. For example, the battery 102 may be a lithium ion (Li-ion) battery containing one or more Li-ion cells. In some examples, the battery 102 may be a nickel-based battery such as a nickel-cadmium (NiCd) battery or a nickel-metal hydride (NiMH) battery. In some examples, the battery 102 may be a Li-ion battery. A typical Li-ion battery may have a state of charge from 100% when floated at 4.2V to 0% when discharged slowly to 2.7V. The battery charging manager 106 may approximate the state of charge (e.g., the battery charge level) using the battery voltage (e.g., received from the charging circuit 104). In some examples, 4.2V may be considered a full charge or charged to 100% capacity (e.g., the maximum battery charge level 145). In some examples, a range of about 2.7V to 3.0V may be considered a fully discharged battery or represent a 0% capacity. However, other techniques may be used to measure and/or to approximate the state of charge. For example, the state of charge may be calculated using voltage translation, coulomb counting, measuring actual capacity by integrating its current from completely full to completely empty (or vice-versa), other techniques or combinations of these techniques.

The battery charging manager 106 may include a processor 105 (e.g., a microcontroller), where the processor 105 is configured to execute instructions, which may be stored in memory 107 to perform various actions, such as those described in this disclosure. The memory 107 may be any type of non-transitory storage medium that is used to store instructions for execution by the battery charging manager 106. In some examples, the memory 107 may include data and information that is obtained by the battery charging manager 106 as related to the battery 102 including event logs, battery voltage set points and/or battery percentage of capacity set points. The user may be provided with controls to control which data is obtained by the battery charging manager 106. The memory 107 also may store information related to other components.

In some examples, the battery charging manager 106 may be implemented as an independent controller. In some examples, the battery charging manager 106 may be implemented as a part of another controller. In this manner, the battery charging manager 106 may be implemented as part of a controller or processor for a device in which the system 100 is implemented. In some examples, the battery charging manager 106 may be implemented as part of a processor for a computing device or as part of a processor (e.g., central processing unit (CPU)) or other controller for a computing device. In some examples, the battery charging manager 106 is implemented as part of an embedded controller for an operating system. For example, the embedded controller may be any type of processor for performing embedded control. The functions performed by the embedded controller may include battery charging, keyboard scanning, power sequencing, and/or temperature monitoring, as well as other background tasks. In some examples, the embedded controller is configured to control the battery charging features.

The prediction engine 120 may compute the predictive charge pattern 126 using the predictive model 122. The predictive charge pattern 126 may identify time(s) (or periods of time) that the system 100 is predicted to use power from the battery 102 (e.g., when the system 100 is predicted to be disconnected from the power source 108). In some examples, the predictive charge pattern 126 identifies one or more periods of time in which the system 100 is predicted to be operating (e.g., consumes power from the battery 102). In some examples, the predictive charge pattern 126 includes predicted battery charge levels over a period of time (including predicted battery charge levels at the time the system 100 is predicted to be disconnected from the power source 108 and/or during period(s) of time in which the system 100 is predicted to be operating).

In some examples, the predictive charge pattern 126 identifies period(s) of time (and/or battery charge levels) in which (or during which) the system 100 is predicted to be in one or more power management states (e.g., working state, sleep state, modern standby, hibernate state, soft off state, mechanical off state, etc.). To compute the predictive charge pattern 126, the prediction engine 120 obtains the signals 110 related to charging activities and uses the signals 110 as inputs to the predictive model 122, where the output of the predictive model 122 is the predictive charge pattern 126. In some examples, the prediction engine 120 computes a prediction confidence level 134 that indicates a level of confidence associated with the predictive charge pattern 126. In some examples, the predictive charge pattern 126 includes values for a temporary charge level 136, a maintenance charge level 144, a maximum battery charge level 145, and/or charge resume time(s) 142, as further described later in the disclosure. A level of confidence may be associated with each of one or more of these values in particular, or a level of confidence may be associated with the predictive charge pattern 126 more generally. In some examples, the predictive charge pattern 126 includes charging parameter(s) associated with a charge curve 157 (as shown in FIG. 1I), which determines when to pause, resume, and/or charging rates for one or more periods of time.

Figure 1B:
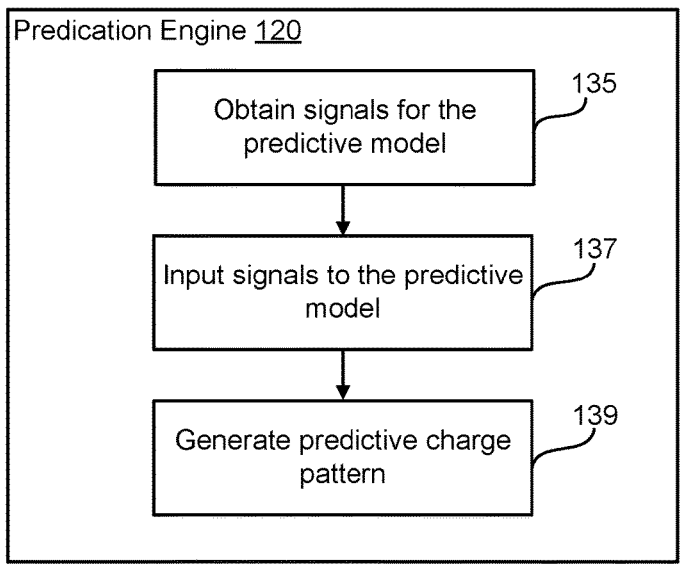
FIG. 1B illustrates a flowchart depicting example operations of a prediction engine according to an aspect.

As shown in FIG. 1B, in operation 135, the prediction engine 120 may obtain the signals 110 for the predictive model 122. In some examples, as shown in FIG. 1A, the signals 110 include charging history data 112 and contextual data 114. The charging history data 112 may include previous times in which the power source 108 was connected and disconnected from the system 100 (e.g., past plug and unplug times). In some examples, the system 100 is implemented in a first device and implemented in a second device. In some examples, the charging history data 112 includes the past plug and unplug times from the first device and the second device. In some examples, the charging history data 112 includes the past plug and unplug times from a single device.

The contextual data 114 may include other relevant information associated with the charging activities of the system 100. In some examples, the contextual data 114 may include time of day, calendar information that specifies the day of the week, detection of a holiday, and/or activities of a user, alarm information specifying the times and/or dates of any alarms associated with the system 100, location information (e.g., the location of the system 100 and/or whether the location is away from the location that is normally used to charge the system 100), the time zone of the system 100, network information indicating whether the system 100 is connected to a network (and, if so, what type of network), whether or not the system 100 is currently being used, and/or temperature of the system 100. The system 100 may provide one or more user controls in order to control the manner and what type of data is obtained and used in the prediction engine 120.

Figure 1C:
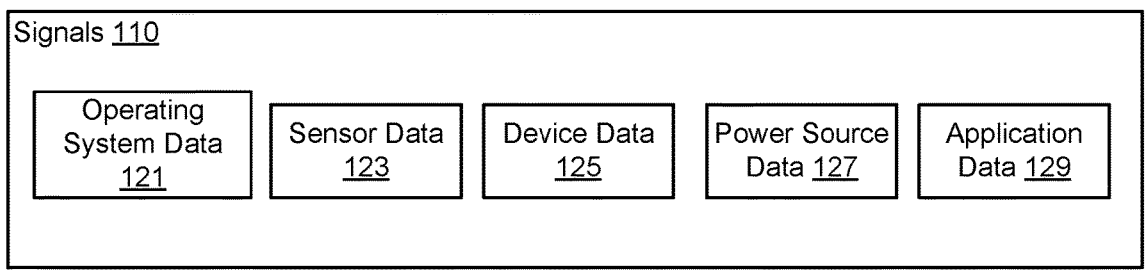
FIG. 1C illustrates an example of signals used by the prediction engine according to an aspect.

In some examples, as shown in FIG. 1C, the signals 110 may include one or more of a variety of signals which provide additional information relevant to the charging activities of the claim 100, where the variety of signals may include operating system data 121, sensor data 123, device data 125, power source data 127, and/or application data 129, which may depend on the application. The operating system data 121 may include any type of information obtained by an operating system associated with the system 100, which may include date, time, day of the week, whether or not the day is a holiday, whether or not an alarm is set, and, if so, the time value of the alarm. The sensor data 123 may include any type of information obtained by sensors associated with the system 100, which may include location data (e.g., GPS data), motion detection data, temperature, etc. The device data 125 may include characteristic(s) about the system 100 such as the type of the device, the type of the battery 102, etc. The power source data 127 may include characteristic(s) about the power source 108 connected to the system 100, which may include whether the power source 108 is an AC adaptor, USB port, etc. The application data 129 may include data from application(s) executing on the operation system associated with the system 100.

In some examples, the prediction engine 120 obtains the signals 110 from the memory 107. In some examples, the prediction engine 120 obtains the signals 110 from another component coupled to the battery charging manager 106 (e.g., another controller or memory coupled to the battery charging manager 106 via a system management bus). In some examples, the prediction engine 120 executes on a device, and the prediction engine 120 obtains the signals 110 from the device. In some examples, the prediction engine 120 obtains the signals 110, over a network, from a server computer. In some examples, the prediction engine 120 executes on a server computer, and the device transmits the signals 110, over the network, to the server computer.

Referring back to FIG. 1B, in operation 137, the prediction engine 120 inputs the signals 110 to the predictive model 122. In some examples, the prediction engine 120 pre-processes the signals 110 to convert the signals 110 into a format compatible with the predictive model 122. In some examples, the prediction engine 120 creates an input feature vector (e.g., $X_1$, $X_2$ through $X_N$), which represents the signals 110. For example, the input feature vector may include the values of the input parameters such as the charging history data 112 and/or the contextual data 114 (and/or any of the data explained with reference to FIG. 1B). In operation 139, the predictive model 122 generates the predictive charge pattern 126, which may be an output vector (e.g., $Y_1$, $Y_2$ through $Y_M$). The prediction engine 120 may store the predictive charge pattern 126 in the memory 107. An example of the generation of the predictive charge pattern 126 is discussed later in the disclosure with respect to FIG. 2. In some examples, the predictive charge pattern 126 identifies a time in which the system 100 is predicted to be disconnected from the power source 108. In some examples, the predictive charge pattern 126 predicts start and end times for one or more future charging cycles. In some examples, the predictive charge pattern 126 identifies a prediction confidence level 134 and/or values for a temporary charge level 136, a maintenance charge level 144, a maximum battery charge level 145, and/or charge resume time(s) 142.

In some examples, the predictive charge pattern 126 includes charging parameter(s) associated with a charge curve 157 (as shown in FIG. 1I), which determines when to pause, resume, and/or charging rates for one or more periods of time. In some examples, the predictive charge pattern 126 specifies the charge rate for one or more periods of time along the charge curve 157 (as shown in FIG. 1I). For example, using the predictive model 122, the prediction engine 120 may specify different charge rates during different periods of time, e.g., charge to 50% at 30 Watts, then 70% at 15 Watts, and then pause at 70% for four hours before resuming charging at 15 Watts. The charge rate may be determined by the prediction engine 120 using the signals 110. In some examples, the signals 110 may include information for the device's battery which may determine the amount of wear caused by charging at different rates. For example, the information may depict that the battery 102 is susceptible to wear at one or more charging rates (or range(s) of charging rates, and the prediction engine 120 may determine the charging rate(s) in a manner that reduces the amount of wear.

The predictive model trainer 116 may train a predictive model 122 and provide the trained predictive model 122 to the prediction engine 120 so that the prediction engine 120 can perform the operations of FIG. 1B. The predictive model trainer 116 may include a processor and a non-transitory computer-readable medium that stores executable instructions that when executed by the processor cause the processor to train the predictive model 122. In some examples, the predictive model trainer 116 is a computing component separate from the prediction engine 120, where the predictive model trainer 116 and the prediction engine 120 communicate with each other via a communication bus or wireless (or wired) connection. In some examples, predictive model trainer 116 executes on a computing device separate from a device executing the prediction engine 120. In some examples, the predictive model trainer 116 is configured to execute on a server computer in communication with the device executing the prediction engine 120. In some examples, the predictive model trainer 116 is included as part of the prediction engine 120 on the same computing device.

Figure 1D:
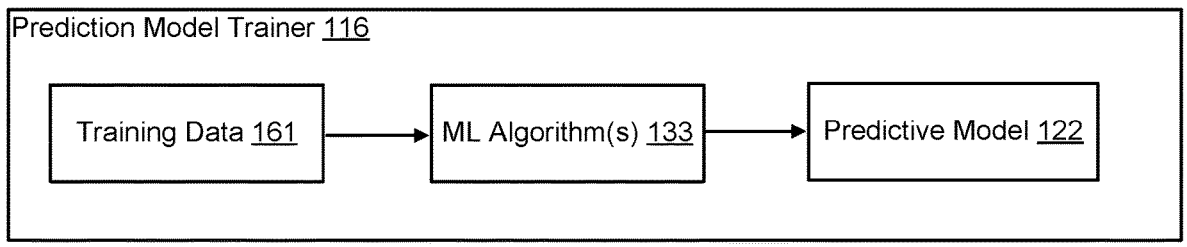
FIG. 1D illustrates a predictive model trainer for training a predictive model according to an aspect.

As shown in FIG. 1D, the predictive model trainer 116 trains the predictive model 122 using training data 161 that is applied to machine-learning algorithm(s) 133. The training data 161 may include one or more (or any combination) of data discussed with respect to the signals 110, which data may be historic data from a previous period of time, for example, data from a past day, past month, a past year, etc. For example, the training data 161 include the charging history data 112, the contextual data 114, the operating system data 121, the sensor data 123, the device data 125, the power source data 127, and/or the application data 129. The training data 161 may include training data generated and collected from the system 100. In some examples, the training data 161 includes training data generated and collected from other systems 100.

The machine-learning algorithms 133 includes one or more of Markov models, logistic regression, decision tree analysis, random forest analysis, neural nets, and combinations thereof. Generally, machine learning is the field where a computer learns to perform classes of tasks using the feedback generated from experience or data that the machine learning process acquires during computer performance of those tasks. In supervised machine learning, the computer can learn one or more rules or functions to map between example inputs and desired outputs as predetermined by an operator or programmer. Labeled data points can then be used in training the computer. Unsupervised machine learning can involve using unlabeled data, and the computer can then identify implicit relationships in the data, for example by reducing the dimensionality of the data set.

The battery charging manager 106 may detect a charging event 138 in response to the power source 108 being connected to the charging circuit 104, and, in response to the charging event 138, the battery charging manager 106 may obtain the predictive charge pattern 126 or cause the prediction engine 120 to compute the predictive charge pattern 126. In some examples, in response to the charging event 138, the battery charging manager 106 obtains the predictive charge pattern 126 from the memory 107. In some examples, in response to the charging event 138, the battery charging manager 106 causes the prediction engine 120 to compute the predictive charge pattern 126.

Figure 1E:
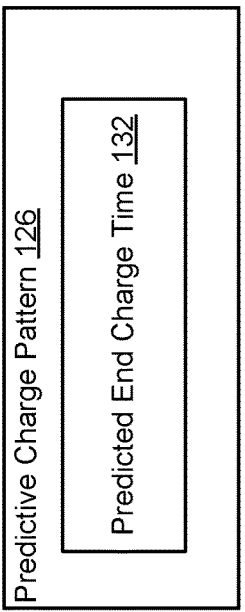
FIG. 1E illustrates a predictive charge pattern according to an aspect.

In some examples, as shown in FIG. 1E, the predictive charge pattern 126 indicates a predicted end charge time 132. The predicted end charge time 132 indicates a time (e.g., a timestamp) that the system 100 is predicted to be disconnected from the power source 108 (e.g., a predicted charge time of when, or corresponding to a time when, a battery of a device is predicted to be disconnected). In some examples, the predicted end charge time 132 includes the clock time, the date, and/or the day of the week. Also, the predictive charge pattern 126 may be associated with a charge duration that indicates a predicted charging period from the time of the charging event 138 to the predicted end charge time 132. As discussed later in the disclosure, in some examples, the battery charging manager 106 may alter the charging pattern (e.g., adjust a charge curve 157 as shown in FIG. 1I) during the predicted charging period (e.g., pausing the charging of the battery 102 during one or more periods, decreasing and/or increasing the charging rate during one or more periods, etc.).

In some examples, the battery charging manager 106 may cause the prediction engine 120 to compute the predictive charge pattern 126 before the detection of the charging event 138, and then store the predictive charge pattern 126 in the memory 107. For example, the battery charging manager 106 may cause the prediction engine 120 to compute the predictive charge pattern 126 at one or more points in time before the battery charging manager 106 detects that the battery 102 is coupled to the power source 108. Then, in response to the charging event 138, the battery charging manager 106 may obtain the predictive charge pattern 126 from the memory 107 and determine whether the predictive charge pattern 126 includes a predictive charge cycle 101 that relates to a current charge cycle. This may allow performance of the approach described herein, even if one or processors/controllers of a device are in a sleep/inactive mode when the battery 102 is coupled to the power source 108.

Figure 1F:
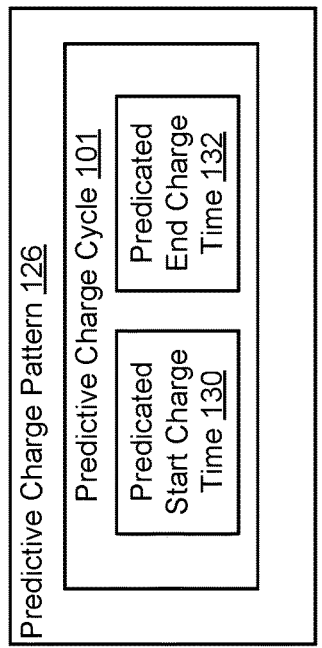
FIG. 1F illustrates a predictive charge pattern according to another aspect.

In some examples, as shown in FIG. 1F, the predictive charge pattern 126 may include a predicted start charge time 130 and a predicted end charge time 132 for a predictive charge cycle 101. The predicted start charge time 130 indicates the time that the system 100 is predicted to be connected to the power source 108, and the predicted end charge time 132 indicates the time that the system 100 is predicted to be disconnected from the power source 108. The predicted start charge time 130 may include the clock time, the date, and/or the day of the week. The predictive charge cycle 101 may be associated with a predicted charge duration (in, or during, which a device having a battery 102 is predicted to be coupled to the power source 108), where the predicted charge duration may thus specify the temporal length of the predictive charge cycle 101 in which the battery 102 is predicted to be charged, e.g., the amount of time between the predicted charge time 130 and the predicted charge time 132 (e.g., in other words, the predicted charge duration may be defined by, or from, a time of detecting a charging event 138 to the predicted end charge time 132. If the time of the charging event 138 falls into the predicted charge duration or is relatively close to the predicted start charge time 130, the battery charging manager 106 may determine that the predictive charge cycle 101 relates to the current charge cycle, and identify the predicted end charge time 132 within the predictive charge pattern 126 as the time in which the system 100 is predicted to be disconnected from the power source 108.

Figure 1G:
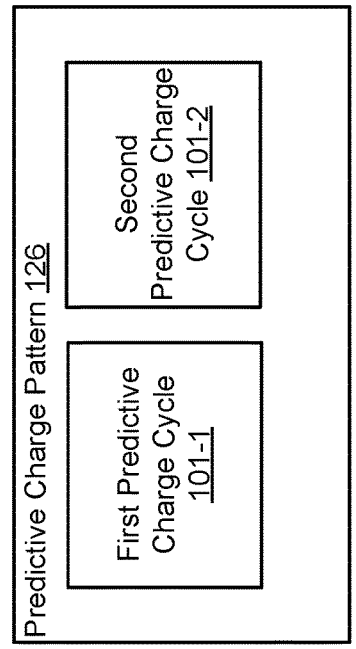
FIG. 1G illustrates a predictive charge pattern according to another aspect.
Figure 1I:
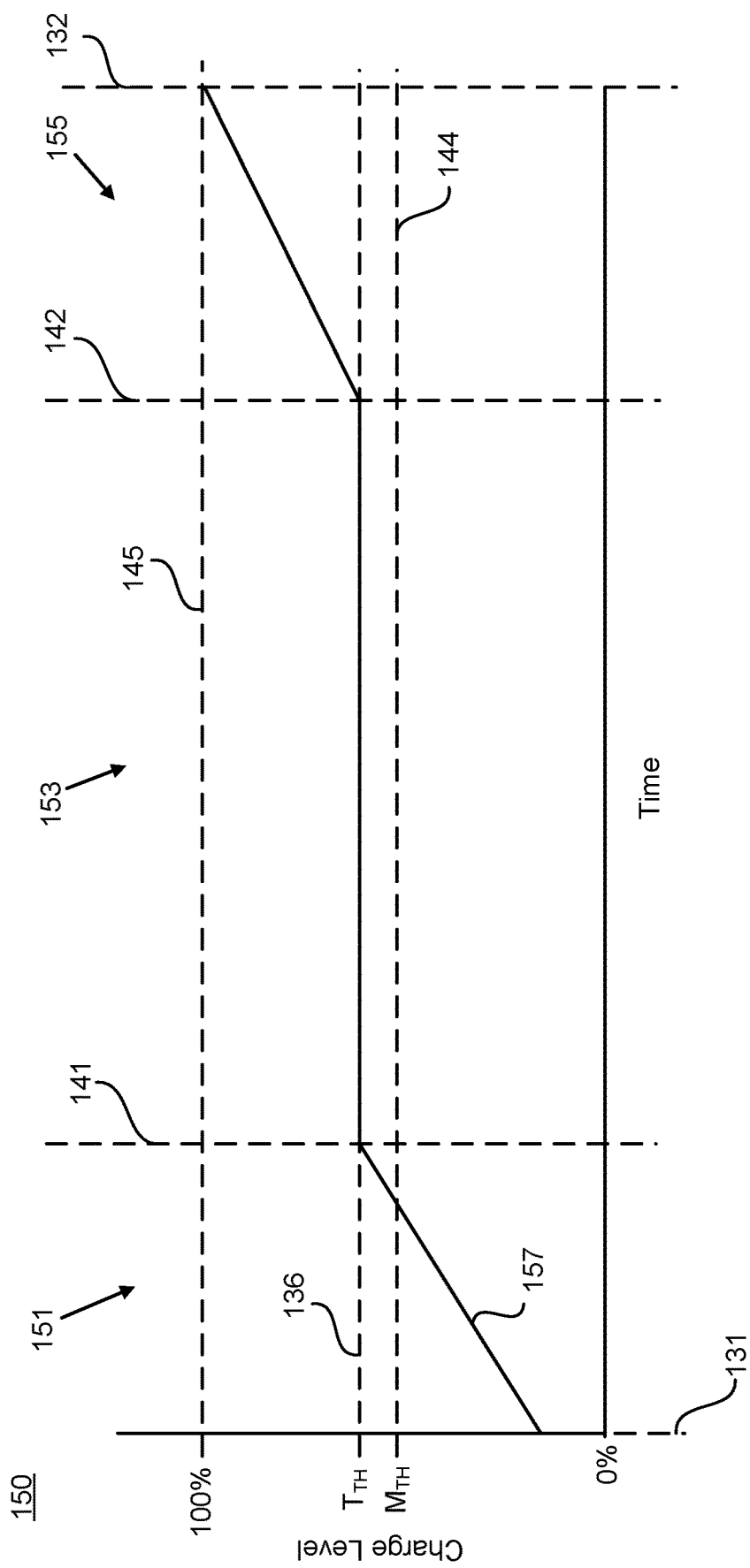
FIG. 1I illustrates a charge curve for controlling a charging of the battery according to an aspect.

In some examples, as shown in FIG. 1G, the predictive charge pattern 126 predicts multiple future charge cycles such as a first predictive charge cycle 101-1 and a second predictive charge cycle 101-2. Each of the first predictive charge cycle 101-1 and the second predictive charge cycle 101-2 may include the predicted start charge time 130 and the predicted end charge time 132. If the time of the charging event 138 falls into the predicted charge duration of the second predictive charge cycle 101-2 or is relatively close to the predicted start charge time 130 of the second predictive charge cycle 101-2, the battery charging manager 106 may determine that the second predictive charge cycle 101-2 relates to the current charge cycle, and identify the predicted end charge time 132 of the second predictive charge cycle 101-2 within the predictive charge pattern 126 as the time in which the system 100 is predicted to be disconnected from the power source 108.

In some examples, the predictive charge pattern 126 predicts one or more operating patterns. The operating patterns may include one or more periods of time that the system 100 is predicted to be operational (e.g., used or working), thereby consuming power from the battery 102. In some examples, the operating patterns identify one or more periods of time on which the system 100 is predicted to be in one or more power management states (e.g., working state, sleep state, modern standby, hibernate state, soft off state, mechanical off state, etc.). In some examples, the operating patterns may predict the amount of battery capacity (e.g., % of the battery level) that will be used in a period of time.

In some examples, the battery charging manager 106 may cause the prediction engine 120 to compute the predictive charge pattern 126 in response to a power management event 111 and store the predictive charge pattern 126 in the memory 107. In some examples, the power management event 111 may indicate that the system 100 has transitioned from a deactivated state (e.g., power-off or sleep state) to an activated state. In some examples, the battery charging manager 106 may cause the prediction engine 120 to periodically compute the predictive charge pattern 126 (e.g., such as upon the expiration of a timer). In some examples, the battery charging manager 106 cause the prediction engine 120 to compute the predictive charge pattern 126 during an active, working state (e.g., not during a power saving state (e.g., sleep state) or when the device is powered-off). The battery charging manager 106 may store the predictive charge pattern 126 in the memory 107, re-determine the predictive charge pattern 126 at a later point, and update or re-store the predictive charge pattern 126 in the memory 107.

In response to the charging event 138 (e.g., detecting that the system 100 is coupled to the power source 108), the battery charging manager 106 may determine whether to alter the charging of the battery 102 using the predictive charge pattern 126. For example, the predictive charge pattern 126 may indicate the predicted end charge time 132, which is the time in which the system 100 is predicted to be disconnected to the system 100. As shown in FIG. 1H, if the duration of the predictive charge cycle 101 (e.g., from the time 131 of the charging event 138 to the predicted end charge time 132) is greater than an estimated period of time 128 to charge the battery 102 from its current battery level to the maximum battery charge level 145 (e.g., from time 131 of the charging event 138 to a time 149 when the battery 102 is estimated to be fully charge), the battery charging manager 106 may adjust control parameter(s) that control the charging of the battery 102 in order to reduce the amount of time spent at higher battery charge levels.

In further detail, the battery charging manager 106 may compute the predicted charge duration from the time 131 of the charging event 138 to the predicted end charge time 132 and estimate the period of time 128 to charge the battery 102 to full capacity from the time 131 of the charging event 138 to the time 149 at which the battery 102 is estimated to be at full capacity If the duration of the predictive charge cycle 101 is greater than the estimated period of time 128 to charge the battery 102 from its current battery level to full capacity, the battery charging manager 106 may determine to alter the charging control of the battery 102.

In some examples, the battery charging manager 106 may control the charging circuit 104 to pause the charging of the battery 102 for a duration of time during the duration of the predictive charge cycle 101 to reduce the amount of time that the battery 102 is (fully) charged and/or maintained at high charge levels to improve the battery capacity performance during its lifetime. Battery service lifetime may therefore be improved. In some examples, the battery charging manager 106 may decrease the charging rate for one or more periods of time (e.g., the duration of a first charging period 151 (as shown in FIG. 1I) and the duration of a second charging period 155 (as shown in FIG. 1I), and a relaxation period 153 (as shown in FIG. 1I) can be determined based on the charging rate for those periods, or vice versa).

The battery charging manager 106 may control the charging circuit 104 to permit the battery 102 to be charged to a temporary charge level 136, and, in response to the charge level of the battery 102 achieving the temporary charge level 136, the battery charging manager 106 may pause the charging of the battery 102, which, in some examples, the charge level of the battery 102 remains (e.g., substantially remains) at the temporary charge level 136 for a period of time. In some examples, the temporary charge level 136 is selected at a time 141 between the time 131 of the charging event 138 and the time 149 of when, or at which, the battery 102 is estimated to be at full capacity. Then, the battery charging manager 106 may resume the charging of the battery 102 at a charge resume time 142 before the time in which the system 100 is predicted to be disconnected from the power source 108 (e.g., before the predicted end charge time 132) such that the battery charge level is close to or at full capacity at the end charge time 132. Impact on device performance may therefore be reduced or eliminated.

The temporary charge level 136 is a battery level that is below the maximum charge level (e.g., below 100% capacity). The temporary charge level 136 may be a state of charge threshold (e.g., expressed in terms of percentage points of the maximum charge of 100%). In some examples, the temporary charge level 136 is between 20% and 95%. In some examples, the temporary charge level 136 is between 40% and 90%. In some examples, the temporary charge level 136 is between 60% and 80%. In some examples, the temporary charge level 136 is between 70% and 80%.

In some examples, the battery charging manager 106 obtains the value of the temporary charge level 136 from the memory 107. In some examples, the temporary charge level 136 is pre-selected. In some examples, the temporary charge level 136 is a fixed value that does not substantially change over time. In some examples, the temporary charge level 136 is a variable value that may change over time. In some examples, the prediction engine 120 computes the temporary charge level 136 along with the predictive charge pattern 126. For example, the value of the temporary charge level 136 may be one of the outputs of the predictive model 122. One of the signals 110 may be temperature, and if the temperature is higher than normal, the prediction engine 120 may decrease the value for the temporary charge level 136 so that the battery charge level is maintained at a lower level. In some examples, the battery charging manager 106 may adjust the value of the temporary charge level 136 using the predictive charge pattern 126 and/or the prediction confidence level 134.

In some examples, the battery charging manager 106 may adjust the value of the temporary charge level 136 using the prediction confidence level 134. For example, if the prediction confidence level 134 is relatively high, the chances that the system 100 will be disconnected from the power source 108 at the predicted end charge time 132 increases. Conversely, if the prediction confidence level 134 is relatively low, the chances that the system 100 will be disconnected from the power source 108 at the predicted end charge time 132 decreases. In some examples, in response to the prediction confidence level 134 being greater than a first threshold level, the battery charging manager 106 may decrease the value of the temporary charge level 136. In response to the prediction confidence level 134 being less than a second threshold level, the battery charging manager 106 may increase the value of the temporary charge level 136 in order to reduce user disappointment if the prediction is not accurate. In this way, impact on device performance can be managed while still providing a reduction in battery degradation by reducing the time spent at higher charge levels.

In some examples, the battery charging manager 106 may compare the current charge level of the battery 102 (e.g., the battery level at the detection of the charging event 138) to the temporary charge level 136. In some examples, if the current battery charge level is greater than the temporary charge level 136, the battery charging manager 106 may adjust the value of the temporary charge level 136 to the value of the current battery charge level. This can prevent discharge of the battery 102 when a user has decided to charge the battery 102, while still providing a reduction in battery degradation by reducing the time spent at higher charge levels.

The battery charging manager 106 calculates the charge resume time 142 using the predicted end charge time 132 and the amount of time required to charge the battery 102 from the temporary charge level 136 to the full capacity. For examples, the battery charging manager 106 may estimate the amount of time required to charge the battery 102 from the temporary charge level 136 to the maximum battery charge level 145, and then set the charge resume time 142 to occur before the predicted end charge time 132 by an amount that corresponds to the amount of time required to charge the battery 102 from the temporary charge level 136 to the maximum battery charge level 145. In this manner, the battery 102 may be fully charged at the predict time of when the system 100 will be disconnected from the power source 108. For example, if the predicted end charge time 132 is 8 am, and the amount of time to charge the battery 102 from the temporary charge level 136 to the maximum battery charge level 145 is one hour, the battery charging manager 106 may control the charging circuit 104 to resume the charging of the battery 102 at 7 am, where the battery 102 is fully charged at 8 am.

With respect to a more specific example, a user may plug in the battery 102 of the system 100 with a 10% charge level before going to sleep at 10 pm. The prediction engine 120 predicts that the system 100 will be unplugged at 8 am. The battery 102 charges to the temporary charge level 136 in about two hours (e.g., 12 am), and the battery charging manager 106 determines that the period of time to charge from the temporary charge level 136 to the full capacity is one hour. The battery charging manager 106 maintains a charge at the temporary charge level 136 for seven hours, and the battery 102 starts to charge at 7 am, where the battery 102 is fully charged at 8 am. The determination that the system 100 will be unplugged at 8am may be based on, for example, one or more alarms being set for 8am on a device associated with the battery 102.

FIG. 1I illustrates a charge curve 157 of the battery 102 coupled to the power source 108 according to an aspect. For example, the battery charging manager 106 may permit charging, over a first charging period 151, the battery 102 to the temporary charge level 136. For example, during the first charging period 151, the battery 102 may be charged at a first charging rate. In some examples, if the estimated time for the battery level to reach the temporary charge level 136 is relatively small, the battery charging manager 106 may adjust the first charging rate to be slower. In some examples, the battery charging manager 106 may increase the first charging rate so that the battery level achieves the temporary charge level 136 faster. The battery charging manager 106 may determine the start of the first charging period 151 in response to the power source 108 being connected to the system 100 (e.g., the detection of the charging event 138 at the time 131). The temporary charge level 136 is below the maximum battery charge level, and, in some examples, may be above the charge level of the battery 102 when the system 100 is connected to the power source 108.

The battery charging manager 106 may maintain, over a relaxation period 153, the battery charge substantially at (or around) the temporary charge level 136. In some examples, referring to FIGS. 1H and 1I, the greater the difference 154 between the duration of the predictive charge cycle 101 and the estimated period of time 128 to charge the battery 102 to full capacity, the greater the duration of the relaxation period 153. The relaxation period 153 may start at the end of the first charging period 151, e.g., when the battery charge level of the battery 102 is equal to or greater than the temporary charge level 136. The end of the relaxation period 153 may be determined by the charge resume time 142.

If the temporary charge level 136 is 80%, the battery charging manager 106 may maintain the battery charge at 80% over the relaxation period 153. In some examples, the battery charging manager 106 may maintain, over the relaxation period 153, the battery charge between the temporary charge level 136 and a maintenance charge level 144. For example, the charge level of the battery 102 may fluctuate between the temporary charge level 136 and the maintenance charge level 144. In some examples, during the relaxation period 153, the battery charge may decrease below the temporary charge level 136, and in response, to the battery charge achieving the maintenance charge level 144, the battery charging manager 106 may permit the charging of the battery 102 back to the temporary charge level 136. The maintenance charge level 144 may be less than the temporary charge level 136, but greater than zero. In some examples, the maintenance charge level 144 is set relatively close to the temporary charge level 136 (e.g., less than five percentage points difference).

The battery charge level may be maintained between the temporary charge level 136 and the maintenance charge level 144 over the relaxation period 153 using trickle charging (e.g., once the temporary charge level 136 is reached, in order to maintain the battery charge level substantially at or around the temporary charge level 136 by compensating for a rate of battery self-discharge) and/or using pulsed charging and/or using any other suitable method of charging. For example, the battery charging manager 106 may charge the battery 102 to the temporary charge level 136 and then cease charging and allow the battery 102 to discharge until the maintenance charge level 144 is reached, whereupon the battery charging manager 106 may again charge the battery 102 to the temporary charge level 136. In this way, the battery charge level may be maintained between the temporary charge level 136 and the maintenance charge level 144 over the relaxation period 153.

The battery charging manager 106, during a second charging period 155 (which may start at the calculated charge resume time 142), permits the charging of the battery 102 from the calculated charge resume time 142 to the maximum battery charge level 145. In some examples, the charge resume time 142 is set such that the battery charge level achieves the maximum battery charge level 145 at the predicted end charge time 132. During the second charging period 155, the battery 102 may be charged at a second charging rate. In some examples, the battery charging manager 106 may increase the second charging rate so that the battery charge level is charged to the maximum battery charge level 145. In some examples, if the prediction confidence level 134 is relatively low, the battery charging manager 106 may increase the second charging rate in order to avoid potential user disappointment where the battery 102 is not fully charged (but the user expected the battery 102 to be fully charged). In some examples, the first charging rate is the same as the second charging rate. In some examples, a varying charge rate is used and the first charging rate is different than the second charging rate. In some examples, the first charging rate is less than the second charging rate. In some examples, the first charging rate is greater than the second charging rate.

Figure 2:
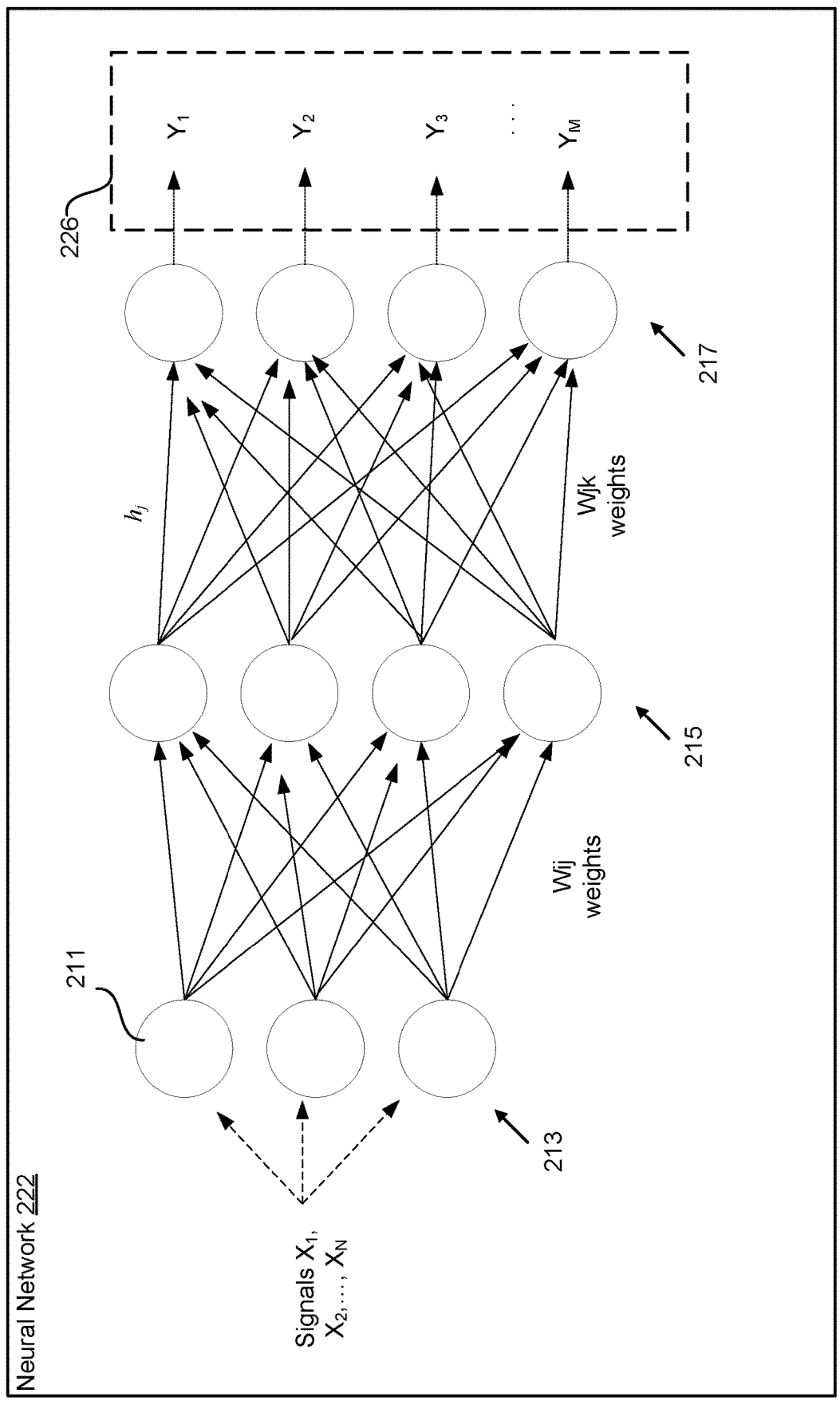
FIG. 2 illustrates a predictive model as a neural network according to an aspect.

FIG. 2 illustrates a neural network 222 configured as the predictive model 122 of FIG. 1A according to an aspect. The neural network 222 is configured to output a predictive charge pattern 226. The predictive charge pattern 226 may be an example of the predictive charge pattern 226 of FIG. 1A and may include any of the details discussed herein. The neural network 222 may be an interconnected group of nodes 211, where each node 211 represents an artificial neuron. The nodes 211 are connected to each other in layers, with the output of one layer becoming the input of a next layer. The neural network 222 transforms an input $X_1$, $X_2$ through $X_N$ (e.g., the signals 110), received by an input layer 213, transform it through one or more hidden layers 215 (e.g., FIG. 2 illustrates one hidden layer 215), and produce an output $Y_1$, $Y_2$, $Y_3$ through $Y_M$ (e.g. the predictive charge pattern 126) via an output layer 217. Each layer is made up of a subset of the set of nodes 211.

Using the neural network 222 to obtain the predictive charge pattern 226 may involve applying weighted and biased numeric input to interconnected nodes 211 in the neural network 222 and computing their output. The weights and bias applied to each node 211 in the neural network 222 may be obtained by training the neural network 222 using, for example, machine learning algorithms (e.g., by the predictive model trainer 116 of FIG. 1A). The nodes 211 in the neural network 222 may be organized in two or more layers including at least the input layer 213 and the output layer 217. For a multi-layered neural network 222, the output from one layer may serve as input to the next layer. The layers with no external output connections may be referred to as the hidden layers 215. The output of each node 211 is a function of the weighted sum of its inputs plus a bias.

To obtain the predictive charge pattern 226, a vector of feature values ($X_1 \ldots X_N$) is applied as the input to each node 211 in the input layer 213. In some examples, the vector of feature values ($X_1 \ldots X_N$) includes the values of the past plug/unplug times, day of the week, holiday, and alarm information, and/or any information described with reference to the signals 110 of the previous figures. The input layer 213 distributes the values to each of the nodes 211 in the hidden layer 215. Arriving at a node 211 in the hidden layer 215, the value from each input node is multiplied by a weight ($w_{jk}$), and the resulting weighted values are summed together and added to a weighted bias value producing a combined value. The combined value is passed through a transfer or activation function, which outputs a value $h_j$. Next, the outputs from the hidden layer 215 are distributed to each of the nodes 211 in the output layer 217 of the neural network 222. Arriving at a node 211 in the output layer 217, the value from each hidden layer node is multiplied by a weight ($w_{kj}$), and the resulting weighted values are summed together and added to a weighted bias value to produce a combined value. The combined value is passed through the transfer or activation function, which outputs $Y_1$ through $Y_M$ (e.g., the output of the neural network 222 or the values of the predictive charge pattern 226).

Figure 3:
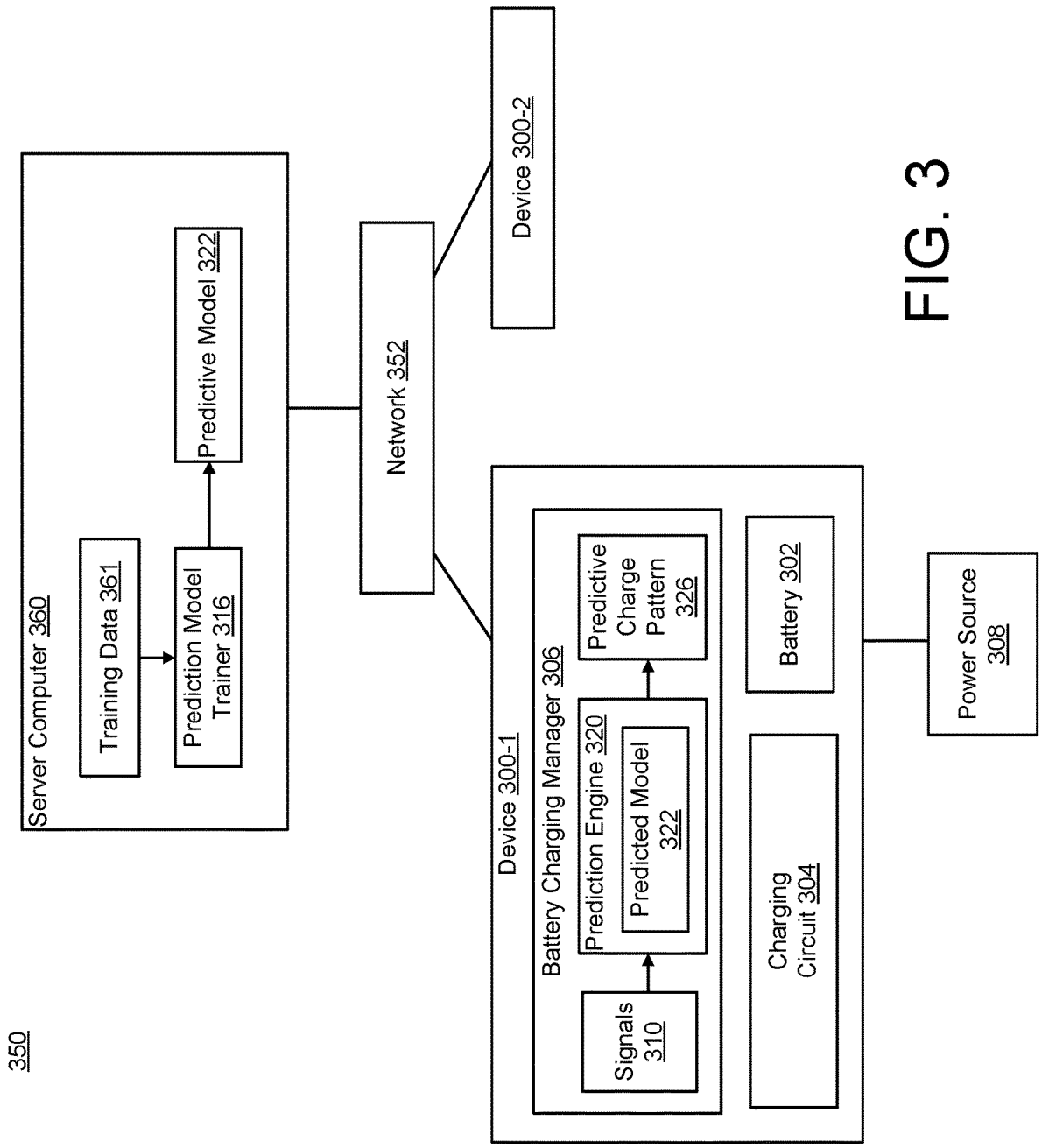
FIG. 3 illustrates a system for controlling the charging of a battery according to an aspect.

FIG. 3 illustrates an example of a system 350 for controlling a charging of a battery 302 according to an aspect. The system 350 may be an example of the system 100 of FIGS. 1A through 1I when at least partially implemented on a server device or computer and may include any of the details discussed with respect to those figures. The system 350 includes a server computer 360, and a plurality of devices configured to be communicatively coupled to the server computer 360 via a network 352. The plurality of devices include a first device 300-1 and a second device 300-2. In some examples, the second device 300-2 may be similar or the same as the first device 300-1.

The first device 300-1 (and the second device 300-2) may be any type of device (e.g., user device) that uses power from a battery and is configured to communicate with a server computer over a network. The first device 300-1 and/or the second device 300-2 may be a cell phone, a smart phone, a tablet device, a laptop computing device, a mobile computing device, a gaming device, a music device, an automobile, an energy power pack, utility scale battery packs, a scooter, a flashlight, an emergency lighting system, or any combinations of these devices or any type of device that uses a rechargeable battery.

The server computer 360 may include a predictive model trainer 316 configured to train a predictive model 322 using training data 361. The training data 361 may include one or more of the types of information described with respect to the input signals 110 of FIG. 1A. In some examples, the training data 361 includes training data obtained from the first device 300-1. In some examples, the training data 361 includes training data obtained from the second device 300-2. The predictive model trainer 316 may be the same/similar to the predictive model trainer 116 of FIG. 1A and may include any of the details discussed herein.

The first device 300-1 includes a battery charging manager 306, a charging circuit 304, and the battery 302. The battery 302 is configured to be recharged by a power source 308 when coupled to the first device 300-1. The battery charging manager 306 may include a prediction engine 320 configured to receive signals 310 and apply the signals 310 to the predictive model 322 to obtain a predictive charge pattern 326.

The predictive model 322 is trained at the server computer 360 by the predictive model trainer 316. In some examples, the predictive model 322 is periodically updated (e.g., re-trained) at the server computer 360. This may reduce power consumption at the device as compared to periodically updating the predictive model 322 at the user device itself. The server computer 360 may transmit digital data representing the predictive model 322, over the network 352, to the first device 300-1 such that the battery charging manager 306 executing on the first device 300-1 can predict when the power source 308 will be disconnected and/or predict one or more charging patterns of the first device 300-1. In some examples, the server computer 360 may transmit the weight and bias information of the predictive model 322, over the network 352, to the first device 300-1. In some examples, the server computer 360 may transmit a reference to the predictive model 322 along with the weight and bias information of the predictive model 322, over the network 352, to the first device 300-1.

The first device 300-1 may store the predictive model 322 (or the updates to the predictive model 322) at the first device 300-1. The battery charging manager 306 may obtain signals 310, input the signals 310 to the predictive model 322, and generate the predictive charge pattern 326. In some examples, the battery charging manager 306 may obtain the signals 310 applied to the predictive model 322 from the first device 300-1. In some examples, the battery charging manager 306 may obtain the signals 310 applied to the predictive model 322, over the network 352, from the server computer 360. In some examples, the battery charging manager 306 may obtain one or more signals 310 from the first device 300-1 and one or more signals 310 from the server computer 360.

Figure 4:
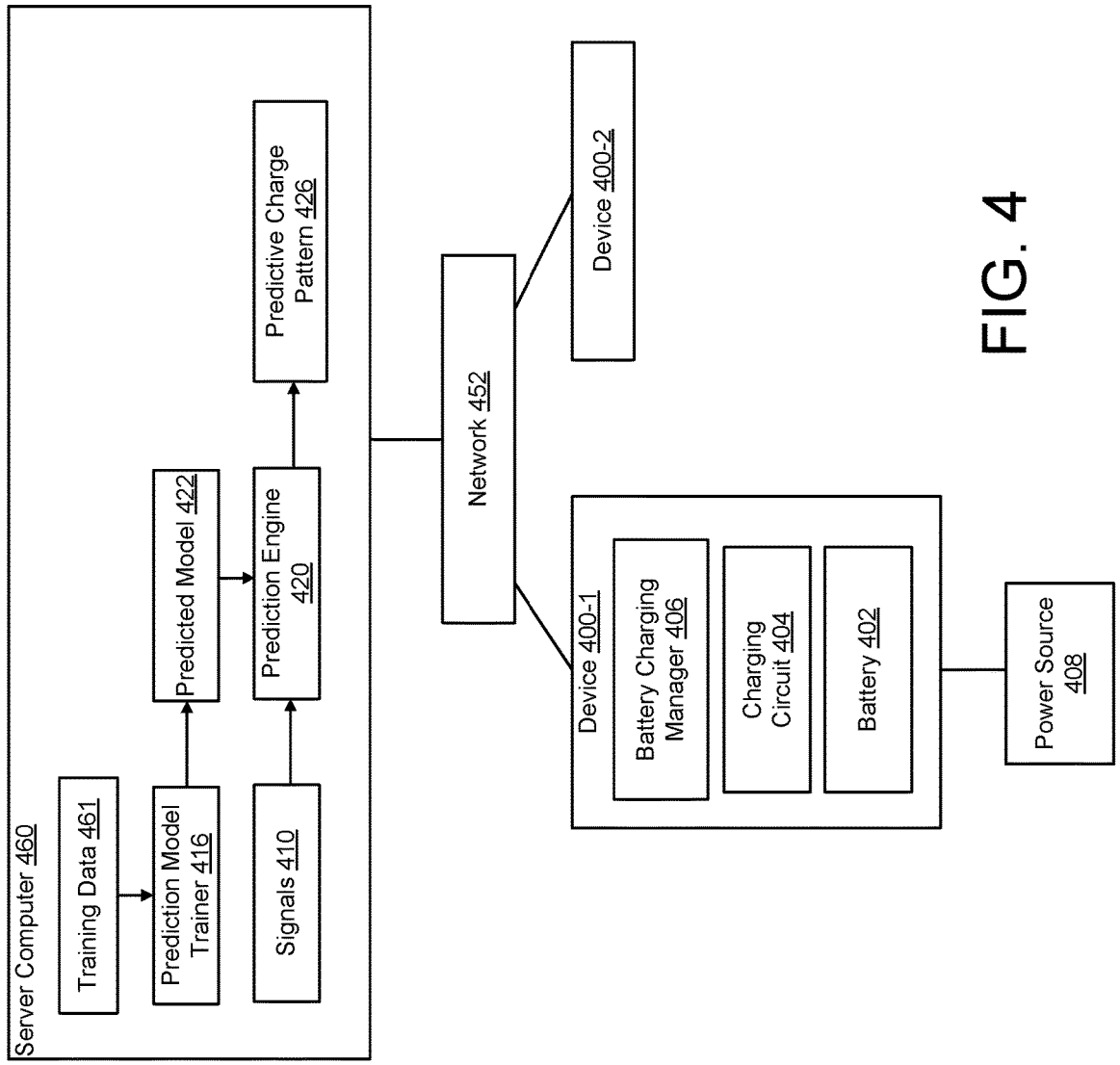
FIG. 4 illustrates a system for controlling the charging of a battery according to another aspect.

FIG. 4 illustrates an example of a system 450 for controlling a charging of a battery 402 according to an aspect. The system 450 may be an example of the system 100 of FIGS. 1A through 1I when at least partially implemented on a server device or computer and may include any of the details discussed with respect to those figures. The system 450 includes a server computer 460, and a plurality of devices configured to be communicatively coupled to the server computer 460 via a network 452. The plurality of devices include a first device 400-1 and a second device 400-2. In some examples, the second device 400-2 may be similar or the same as the first device 400-1.

The first device 400-1 (and the second device 400-2) may be any type of device (e.g., user device) that uses power from a battery and is configured to communicate with a server computer over a network. The first device 400-1 and/or the second device 400-2 may be a cell phone, a smart phone, a tablet device, a laptop computing device, a mobile computing device, a gaming device, a music device, an automobile, an energy power pack, utility scale battery packs, a scooter, a flashlight, an emergency lighting system, or any combinations of these devices or any type of device that uses a rechargeable battery.

The server computer 460 may include a predictive model trainer 316 configured to train a predictive model 422 using training data 361, and a prediction engine 420 that employs the trained predictive model 422. For example, the prediction engine 420 may obtain signals 410 associated with the first device 400-1 and input the signals 410 to the prediction engine 420 to generate a predictive charge pattern 426. In some examples, the server computer 460 trains the predictive model 422 and performs the prediction, which is sent to the first device 400-1 over the network 452. Power consumption by the first device 400-1 may therefore be reduced as compared to generating the predictive charge pattern 426 at the first device 400-1, which may be beneficial for battery operated devices as described herein. The training data 461 may include one or more of the types of information described with respect to the input signals 110 of FIG. 1A. In some examples, the training data 461 includes training data obtained from the first device 300-1. In some examples, the training data 461 includes training data obtained from the second device 400-2. The predictive model trainer 416 may be the same/similar to the predictive model trainer 116 of FIG. 1A and may include any of the details discussed herein.

The first device 400-1 includes a battery charging manager 406, a charging circuit 404, and the battery 402. The battery 402 is configured to be recharged by a power source 408 when coupled to the first device 400-1. The battery charging manager 406 may receive, over the network 452, the predictive charge pattern 426, and the battery charging manager 406 may controls the charging of the battery 402 in accordance with the techniques discussed with reference to the previous figures. In some examples, the first device 400-1 sends a signal, over the network 452, that notifies the server computer 460 of a detecting charging event (e.g., the power source 408 being connected to the first device 400-1). In response to the signal, the prediction engine 420 may obtain the signals 410 and apply the signals 410 to the predictive model 422 (e.g., previously trained by the predictive model trainer 416) to generate the predictive charge pattern 426, which is then transmitted, over the network 452, back to the first device 400-1.

Figure 5:
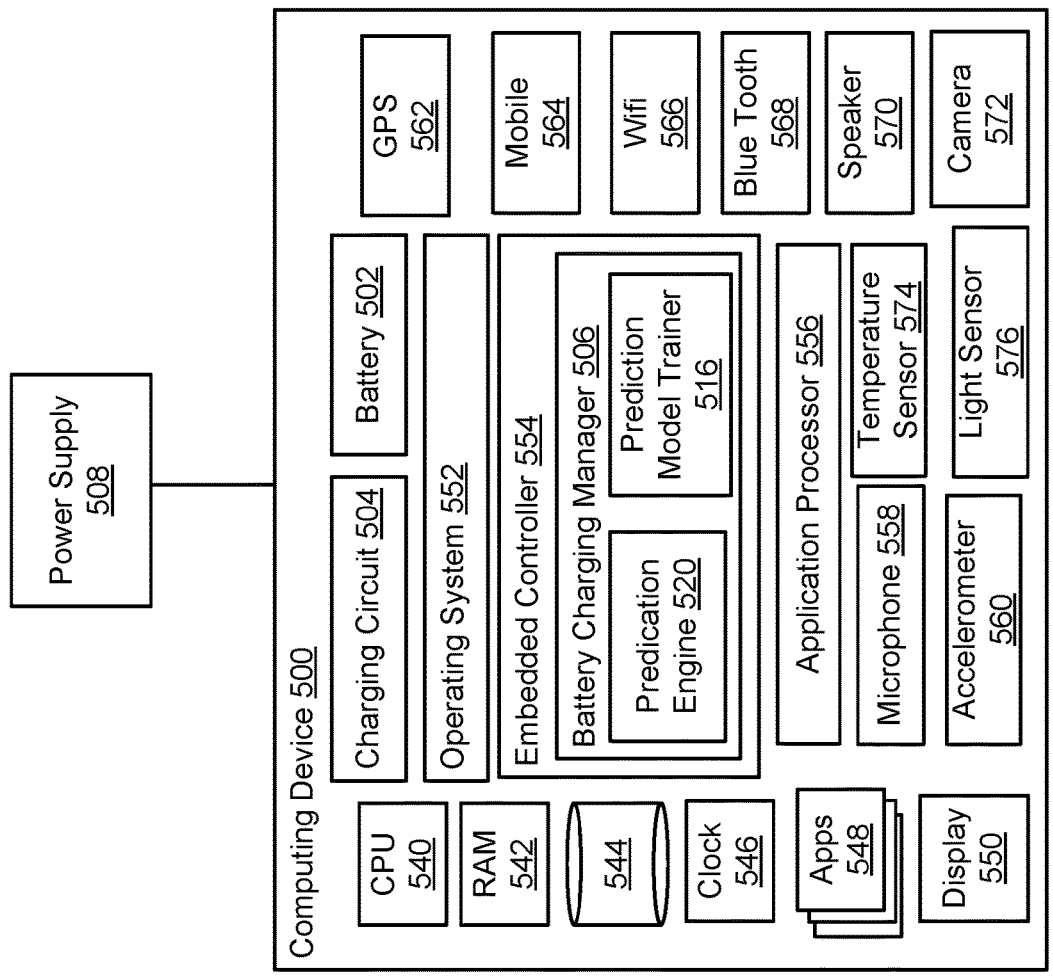
FIG. 5 illustrates a computing device for controlling the charging of a battery according to an aspect.

FIG. 5 is a schematic diagram of a computing device 500 configured to control a charging of a battery 502 by a power source 508 according to an aspect. The computing device 500 may be configured to communicate with a server computer (e.g., the server computer 360 of FIG. 3 and/or the server computer 460 of FIG. 4). The computing device 500 may be an example of the system 100 of FIG. 1A, the first device 300-1 of FIG. 3, and/or the first device 400-1 of FIG. 4 and may include any of the details discussed with reference to those figures.

The computing device 500 may be consumer computing device and can be a mobile computing device (e.g., a smart phone, a PDA, a tablet, a wearable device, such as a wrist or head mounted device, a virtual reality device, or a laptop computer), a robotic computing device (e.g., a drone), and/or a non-mobile personal computing device (e.g., a desktop computing device, internet-enabled television or entertainment system).

The computing device 500 includes a battery 502, and a charging circuit 504 coupled to the battery 502. The computing device 500 may include an embedded controller 554 and an application processor 556. The embedded controller 554 may be any type of processor for performing embedded control for the computing device 500. In some examples, the embedded controller 554 is a microprocessor. The embedded controller 554 may be configured to control battery charging, keyboard scanning, power sequencing, and/or temperature monitoring, as well as other background tasks.

The embedded controller 554 includes a battery charging manager 506. The battery charging manager 506 may be an example of the battery charging manager 106 of FIG. 1A and may include any of the details described herein. In some examples, the battery charging manager 506 includes a prediction engine 520. In some examples, the prediction engine 520 is located at a server computer and the battery charging manager 506 receives the results of the prediction engine 520 (e.g., receives the predictive model and/or outputs of the predictive model such as the predictive charge pattern). In some examples, the battery charging manager 506 includes a predictive model trainer 516. In some examples, the predictive model trainer 516 is located at a server computer and the battery charging manager 506 receives the trained predictive model from the server computer.

In some examples, the embedded controller 554 is a relatively small controller, and not capable of executing the prediction engine 520 when the computing device 500 is in a deactivated state (e.g., turned off) or in a power saving state (e.g., in sleep mode) due to power constraints. The embedded controller 554 may therefore execute the prediction engine 520 when the computing device 500 is in an activated, non-sleep state mode (e.g., in response to a power management event received by the embedded controller 554).

However, in some examples, the computing device 500 is connected to the power source 508 to charge the battery 102 when the computing device 500 is in the power saving state. In some examples, the embedded controller 554 is configured to cause the prediction engine 520 to generate the predictive charge pattern at one or more times when the computing device is in the activated, non-sleep state mode, and then store the predictive charge pattern in the memory (e.g., a volatile memory 542 or non-volatile memory 544) of the computing device 500. In response to the embedded controller 554 detecting a charging event, the embedded controller 554 may obtain the predictive charge pattern from the memory and control the charging of the battery 502 according to any of the techniques discussed herein. These actions are relatively low power as compared to executing the prediction engine 520 and may thus be performed by the embedded controller 554 in a power saving mode. Battery charging may therefore be controlled to reduce battery degradation, while at the same time managing power constraints of the device itself.

The application processor 556 may be any type of processor designed to support application 548 executing on an operating system 552 of the system 300. In more detail, the application processor 556 may enable various Internet Protocol (IP)-based applications including data, audio, and/or video applications. In one implementation, the application processor 556 may be the main computing chip in the system, which is responsible for performing most of the computing operations including handling user interactions.

The computing device 500 may include one or more processors 540 (e.g., a processor formed in a substrate, such as a central processing unit, a graphics processor, etc.), a volatile memory 542, and nonvolatile memory 544. The volatile memory 542 may store, for example, instructions that are executed by the processor(s) 540, and the nonvolatile memory 544 may store, for example, various user data, instructions for executing an operating system, applications, etc.

The computing device 500 may include a plurality of applications 548, which can be executed by the computing device 500 (e.g., by the processor 540 executing instructions stored in memory 542 or 544 that correspond to the application) and which may communicate with an operating system 552 (e.g., through one or more application programming interfaces (APIs)). Execution of the applications 548 can provide various functionalities to a user of the computing device 500. A camera application can provide access to use of a camera 572 within the computing device 500 for capturing still pictures or video.

The computing device 500 includes a display 550 (e.g., a touchscreen display, an LED display, etc.) that can display a user interface for an application 548 that is being executed by the device. The computing device 500 may include internal speakers 570 that can provide an audio output from the device. The computing device 500 may also include a port or interface (e.g., USB, micro-USB, cable interfaces, HDMI, wireless interface, etc.) that can be used to connect the computing device 500 to external devices, e.g., speakers that may provide an audio output when connected to the device 500 or other types of sensors, cameras, or computing devices. The computing device 500 may also include a microphone 558 that detects sound in the environment of the computing device 500.

The computing device 500 may also include a clock 546 that determines a time and date and may include a GPS transceiver 562 that communicates with a global positioning system to determine the location of the computing device 500. The computing device 500 also includes various network interface circuitry, such as for example, a mobile network interface 564 through which the computing device 500 can communicate with a cellular network, a Wi-Fi network interface 566 with which the computing device 500 can communicate with a Wi-Fi base station, a BLUETOOTH network interface 568 with which the computing device 500 can communicate with other BLUETOOTH devices (e.g., an external camera, microphone, or speakers), and/or an Ethernet connection or other wired connection that enables the computing device 500 to access network. The computing device 500 may include other sensors, such as, for example, an ambient light sensor 576, a temperature sensor 574, and an accelerometer 560.

Figure 6:
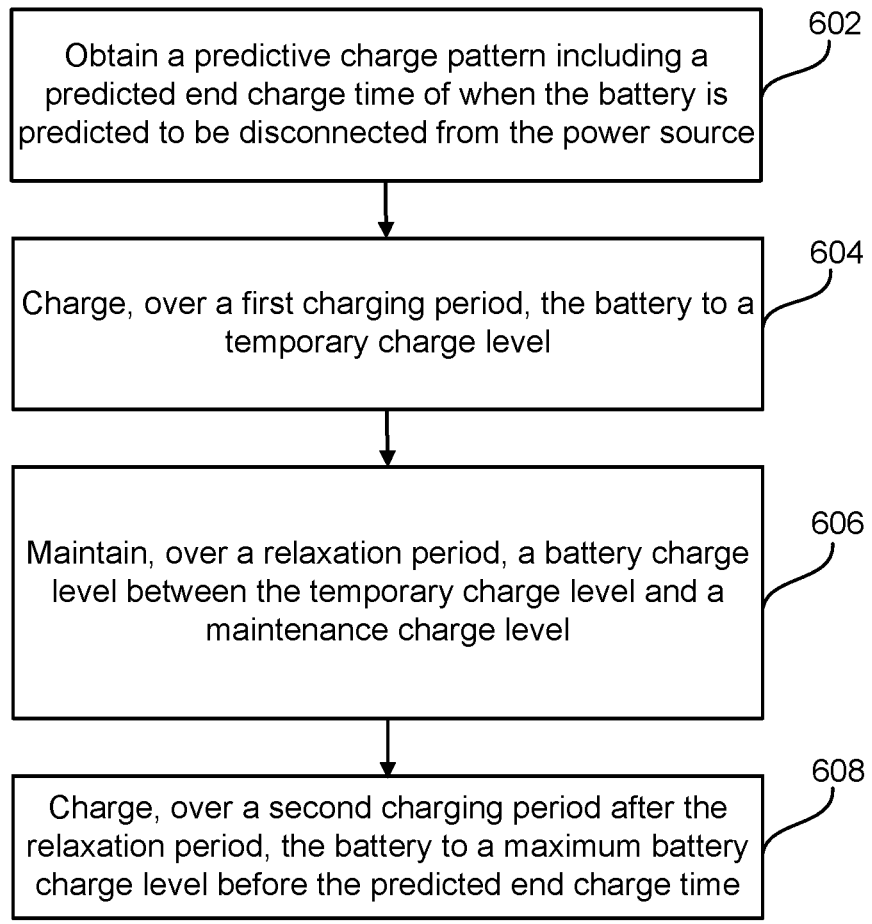
FIG. 6 illustrate a flowchart depicting example operations of a system for controlling the charging of a battery according to an aspect.

FIG. 6 illustrates a flowchart 600 depicting example operations of the system 100 according to an aspect. Although the flowchart 600 is described with reference to the system 100 of FIGS. 1A through 1I, the operations of FIG. 6 may be applicable to any of the embodiments discussed herein.

Operation 602 includes obtaining the predictive charge pattern 126, where the predictive charge pattern 126 includes the predicted end charge time 132, and the predicted end charge time 132 indicates the time of when the battery 102 is predicted to be disconnected from the power source 108. In some examples, the battery charging manager 106 obtains the predictive charge pattern 126 from the memory 107. In some examples, the battery charging manager 106 causes the prediction engine 120 to compute the predictive charge pattern 126.

Operation 604 includes charging, over the first charging period 151, the battery 102 to the temporary charge level 136. Operation 606 includes maintaining, over the relaxation period 153, a battery charge level between the temporary charge level 136 and a maintenance charge level 144. Operation 608 includes charging, over the second charging period 155 after the relaxation period 153, the battery 102 to the maximum battery charge level 145 before the predicted end charge time 132.

Figure 7:
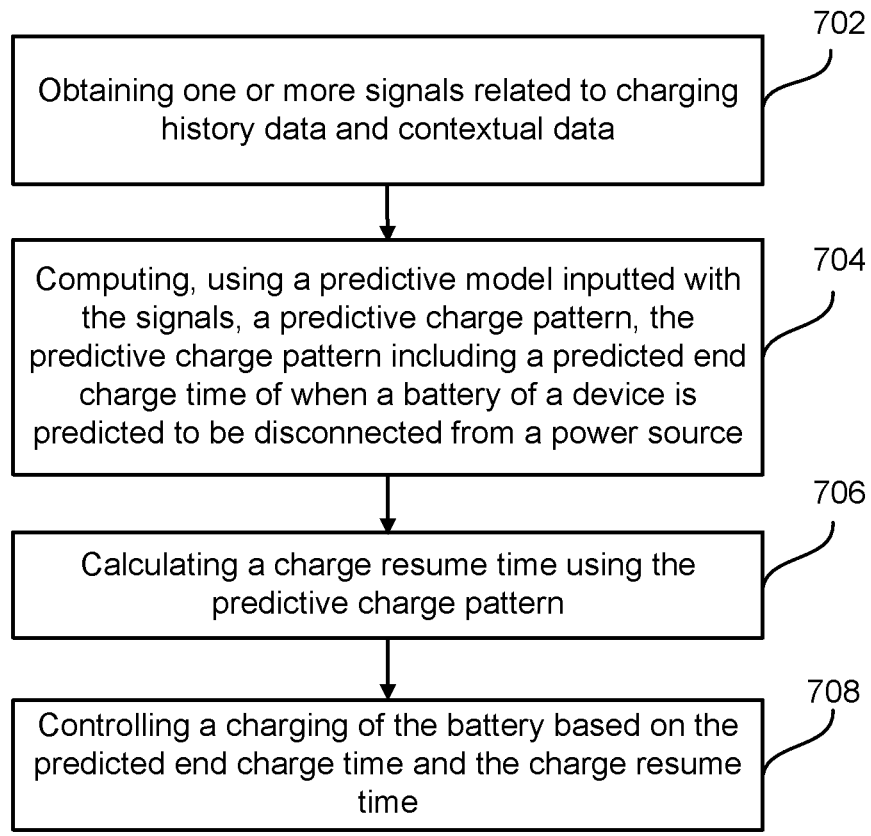
FIG. 7 illustrate a flowchart depicting example operations of a system for controlling the charging of a battery according to another aspect.

FIG. 7 illustrates a flowchart 700 depicting example operations of the system 100 according to an aspect. Although the flowchart 700 is described with reference to the system 100 of FIGS. 1A through 1I, the operations of FIG. 7 may be applicable to any of the embodiments discussed herein.

Operation 702 includes obtaining signals 110 related to charging history data 112 and contextual data 114. Operation 704 includes computing, using a predictive model 122 inputted with the signals 110, a predictive charge pattern 126, where the predictive charge pattern 126 including a predicted end charge time 132 of when (or corresponding to a time when) a battery 102 of a device is predicted to be disconnected from a power source 108. Operation 706 includes calculating a charge resume time 142 using the predictive charge pattern 126. Operation 708 includes controlling a charging of the battery 102 using the predicted end charge time 132 and the charge resume time 142. In some examples, operation 708 includes charging, over a first charging period 151, the battery 102 to a temporary charge level 136, maintaining, over a relaxation period 153, a battery charge level between the temporary charge level 136 and a maintenance charge level 144, and/or charging, over a second charging period 155 starting at the charge resume time 142, the battery 102 to a maximum battery charge level 145 before the predicted end charge time 132.

Figure 8:
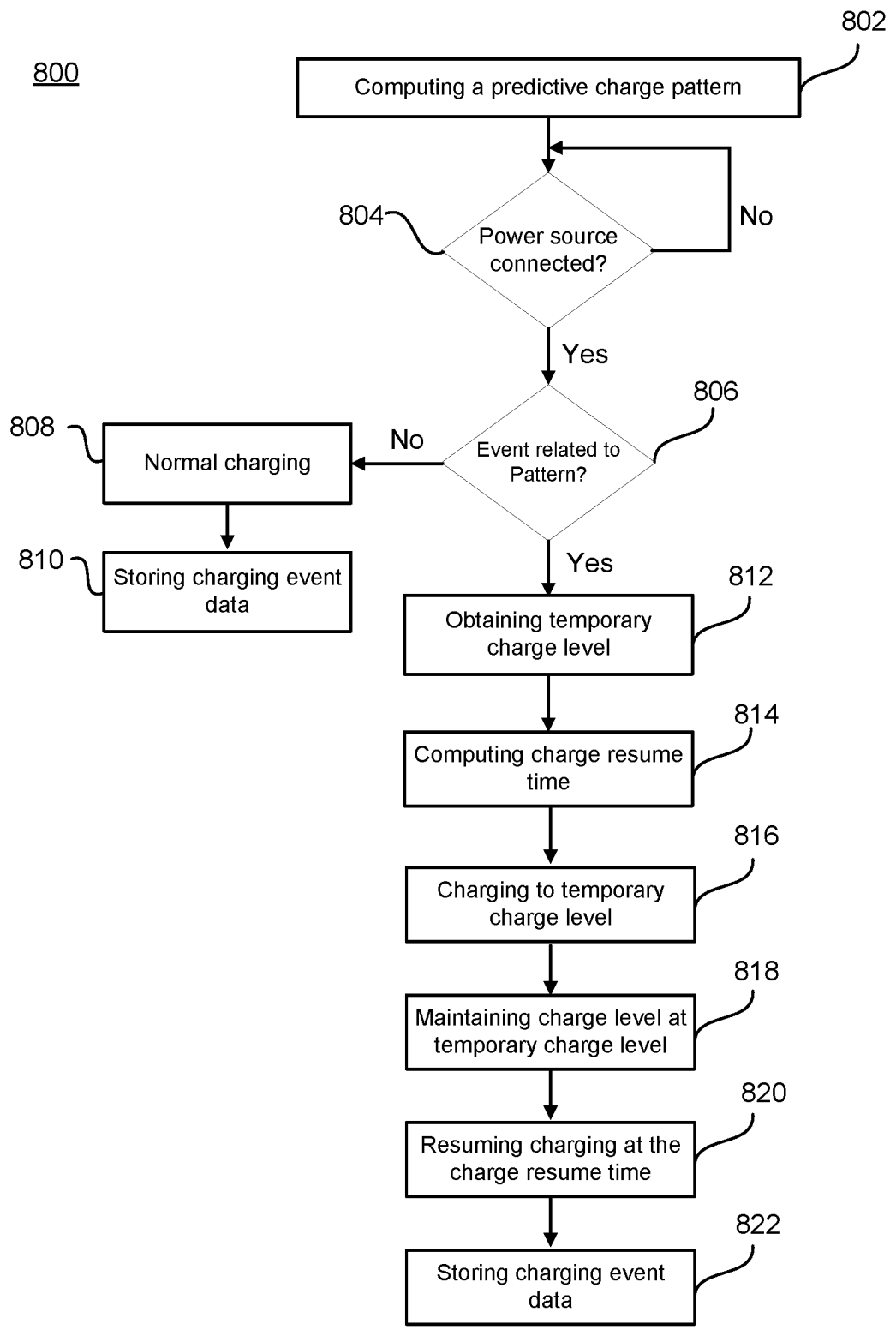
FIG. 8 illustrate a flowchart depicting example operations of a system for controlling the charging of a battery according to another aspect.

FIG. 8 illustrates a flowchart 800 depicting example operations of the system 100 according to an aspect. Although the flowchart 800 is described with reference to the system 100 of FIGS. 1A through 1I, the operations of FIG. 8 may be applicable to any of the embodiments discussed herein.

Operation 802 includes computing a predictive charge pattern 126. Operation 804 includes determining whether a power source 108 is connected to a system 100. Operation 806 includes determining whether a charging event 138 is related to the predictive charge pattern 126. If no, operation 808 includes controlling the charging of the battery 102 according to a normal charging operation (e.g., where the charging pattern is not adjusted), and operation 810 includes storing charging event data in the memory 107 of the system 100. If yes, operation 812 includes obtaining a temporary charge level 136. Operation 814 includes computing a charge resume time 142. Operation 816 includes charging to the temporary charge level 136. Operation 818 includes maintaining the charge level at the temporary charge level 136 and/or between the temporary charge level 136 and a maintenance charge level 144. Operation 820 includes resuming the charging of the battery 102 at the charge resume time 142. Operation 822 includes storing the charging event data in the memory 107 of the system 100.

Figure 9:
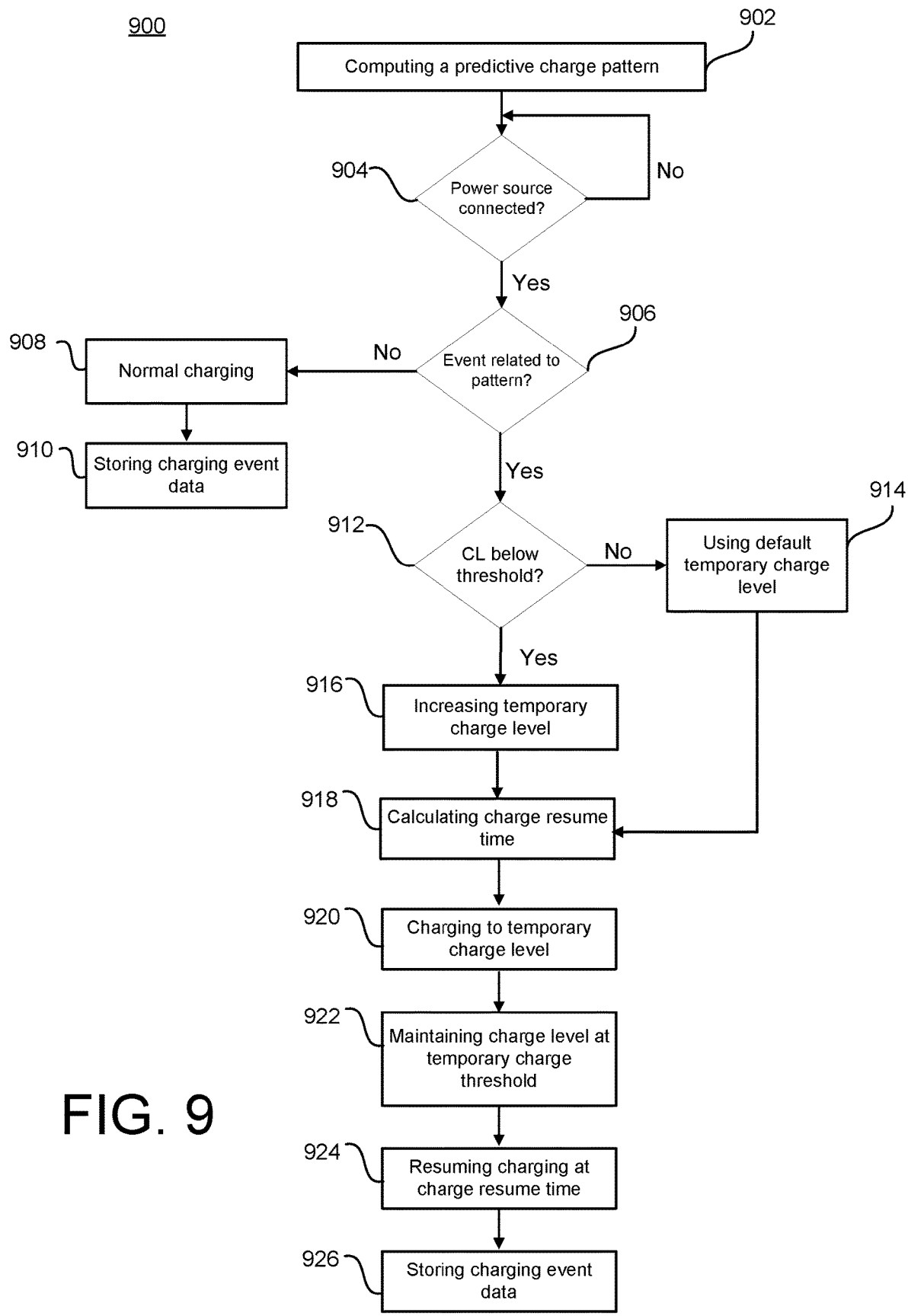
FIG. 9 illustrate a flowchart depicting example operations of a system for controlling the charging of a battery according to another aspect.

FIG. 9 illustrates a flowchart 900 depicting example operations of the system 100 according to an aspect. Although the flowchart 900 is described with reference to the system 100 of FIGS. 1A through 1I, the operations of FIG. 9 may be applicable to any of the embodiments discussed herein.

Operation 902 includes computing a predictive charge pattern 126. Operation 904 includes determining whether a power source 108 is connected to a system 100. Operation 906 includes determining whether the charging event 138 is related to the predictive charge pattern 126. If no, operation 908 includes controlling the charging of the battery 102 according to a normal charging operation, and operation 910 includes storing the charging event data in the memory 107 of the system 100. If yes, operation 912 includes determining whether a prediction confidence level 134 is below a threshold. If no, operation 914 includes using a default value for the temporary charge level 136. If yes, operation 916 includes increasing a value of the temporary charge level 136. Operation 918 includes calculating a charge resume time 142. Operation 920 includes charging to the temporary charge level 136. Operation 922 includes maintaining the charge level at the temporary charge level 136 and/or between the temporary charge level 136 and a maintenance charge level 144. Operation 924 includes resuming the charging at the charge resume time 142. Operation 926 includes storing the charging event data in the memory 107 of the system 100.

Figure 10:
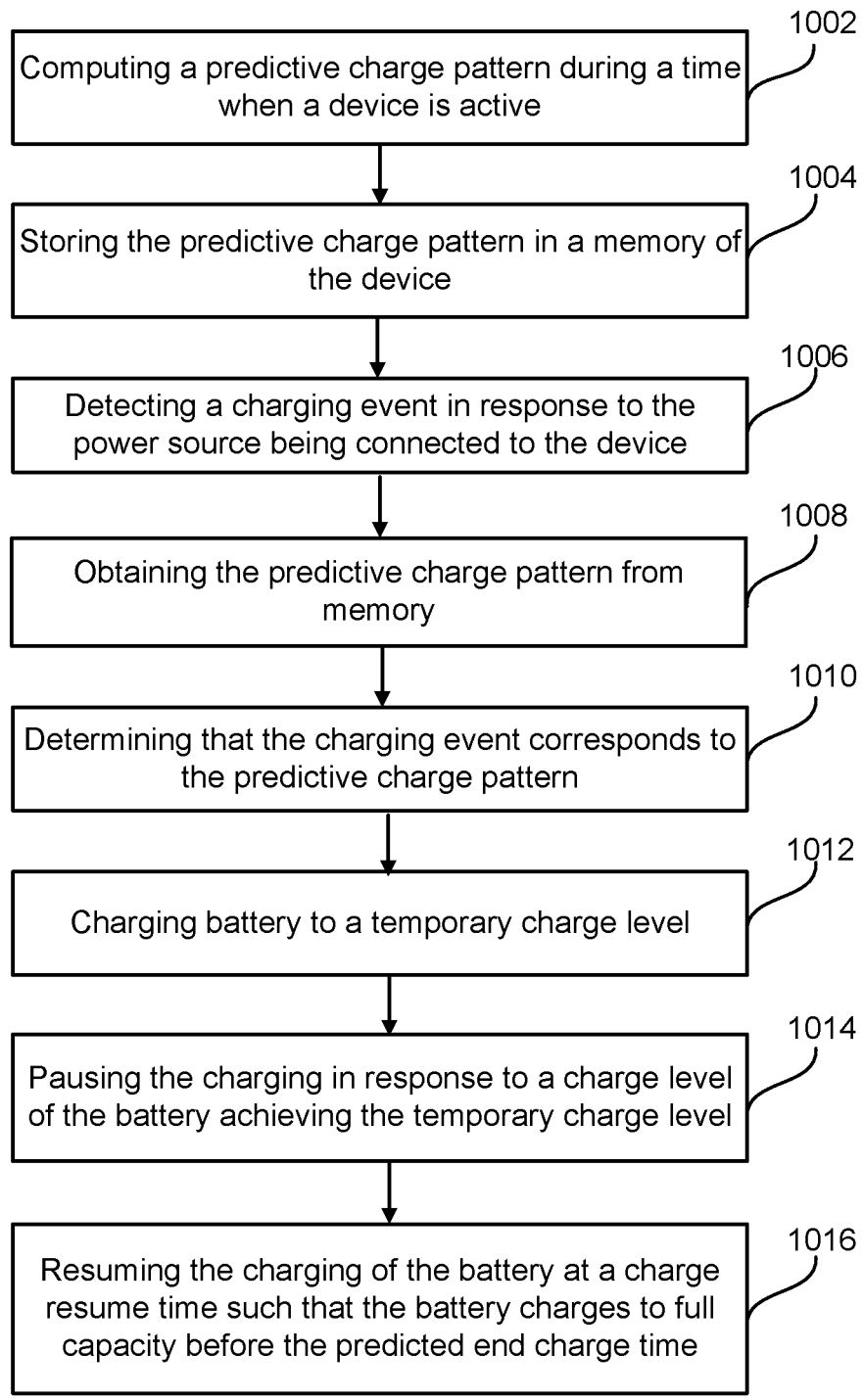
FIG. 10 illustrate a flowchart depicting example operations of a system for controlling the charging of a battery according to another aspect.

FIG. 10 illustrates a flowchart 1000 depicting example operations of the system 100 according to an aspect. Although the flowchart 1000 is described with reference to the system 100 of FIGS. 1A through 1I, the operations of FIG. 10 may be applicable to any of the embodiments discussed herein.

Operation 1002 includes computing a predictive charge pattern 126 during a time when a device is active. Operation 1004 includes storing the predictive charge pattern 126 in the memory 107 of the device. Operation 1006 includes detecting a charging event 138 in response to the power source 108 being connected to the device. Operation 1008 includes obtaining the predictive charge pattern 126 from the memory 107. Operation 1010 includes determining that the charging event 138 corresponds to the predictive charge pattern 126. Operation 1012 includes charging the battery 102 to a temporary charge level 136. Operation 1014 includes pausing the charging in response to a charge level achieving the temporary charge level 136. Operation 1016 includes resuming the charging of the battery 102 at a charge resume time 142 such that the battery 102 charges to full capacity before the predicted end charge time 132.

Figure 11:
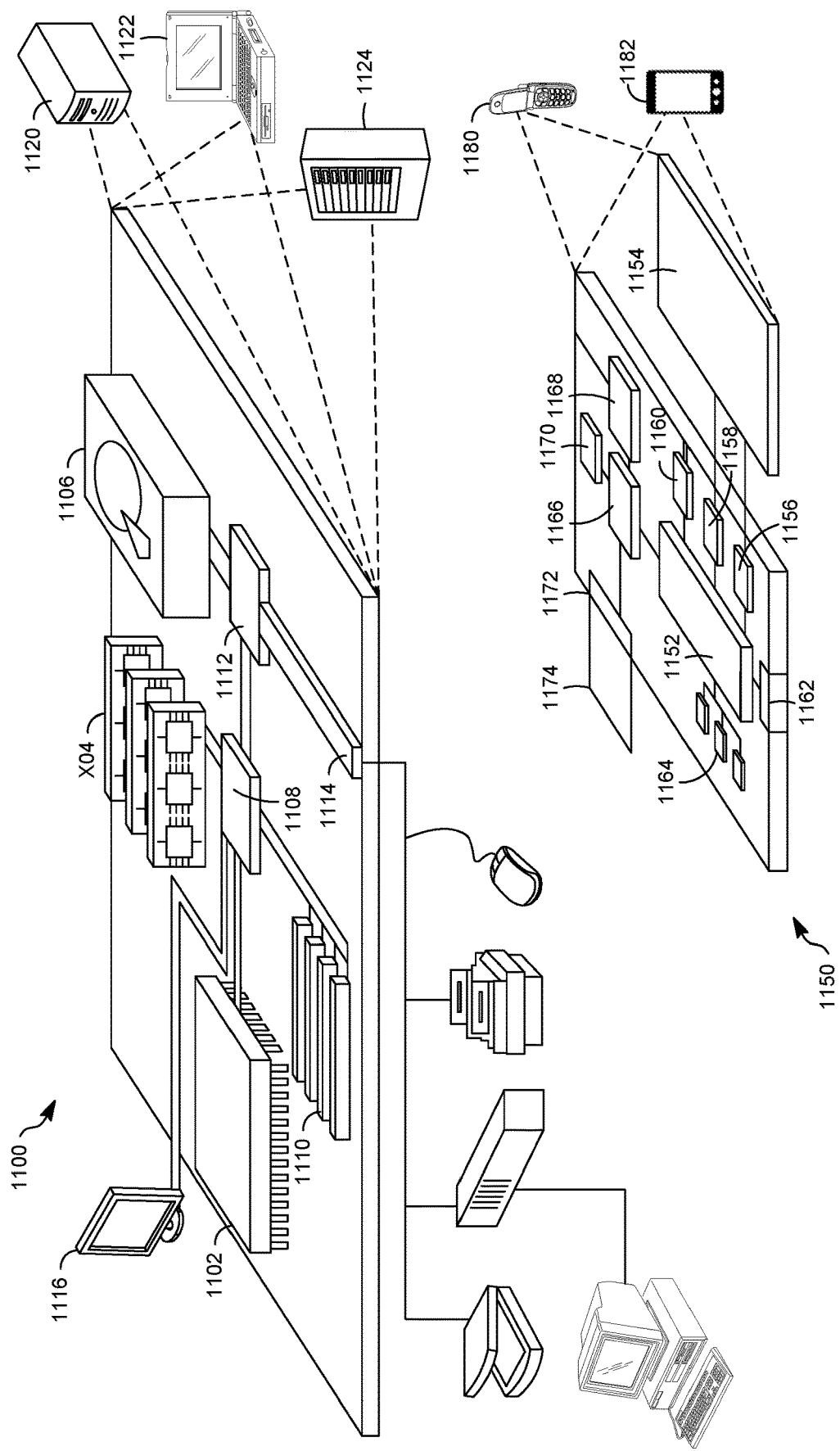
FIG. 11 shows an example of a computer device and a mobile computer device that can be used to implement the techniques described herein according to an aspect.

FIG. 11 shows an example of a generic computer device 1100 and a generic mobile computer device 1150, which may be used with the techniques described here. Computing device 1100 is intended to represent various forms of digital computers, such as laptops, desktops, tablets, workstations, personal digital assistants, televisions, servers, blade servers, mainframes, and other appropriate computing devices. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. The processor 1102 can be a semiconductor-based processor. The memory 1104 can be a semiconductor-based memory. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a micro-drive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provided in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provided as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, include recorded sound (e.g., voice messages, music files, etc.) and/or may also include sound generated by applications operating on device 1150.

Further to the descriptions above, a user may be provided with controls allowing the user to make an election as to both if and when systems, programs or features described herein may enable obtaining any of the charging or operational information of the device described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

According to an aspect, a method includes charging, over a first charging period, a battery connected to a power source (e.g., an external power source) to a temporary charge level (e.g., a temporary state of charge (SOC) level), where the temporary charge level is below a maximum battery charge level. The method includes maintaining, over a relaxation period from the end of the first charging period to a calculated time point (e.g., the charge resume time 142), the battery charge between the temporary charge level and a maintenance charge level (e.g., a maintenance SOC level) lower than the temporary charge level. The method includes charging, over a second charging period starting from the calculated time point, the battery to the maximum battery charge level.

According to some aspects, the method may include any one or more of the following features (or any combination thereof). The method includes identifying a predicted charge time duration from a predictive charge pattern, where the calculated time point is calculated such that the battery charges from the temporary charge level to the maximum battery charge level before the expiration of the predicted charge time duration. The method may include calculating the calculated time point based on the predictive charge pattern. The method may include determining the predictive charge pattern based on one or more signals relating to charging activities. The method may include determining the predictive charge pattern based on applying the one or more signals relating to charging activities to a machine learning model/executing a pattern matching algorithm. The method may include, in response to the predicted charge time duration being greater than a time to charge the battery to the maximum battery charge level, performing any one or more of the operations discussed above.

According to an aspect, a method includes identifying a predicted charge time duration from a predictive charge pattern, and, in response to the predicted charge time duration being greater than a time to charge a battery connected to an external power source to a maximum battery charge level, the method may include the following operations (or any combination thereof) charging, over a first charging period, the battery to a temporary charge level below the maximum battery charge level, maintaining, over a relaxation period from the end of the first charging period to a calculated time point, the battery charge between the temporary charge level and a maintenance charge level lower than the temporary charge level, and charging, over a second charging period starting from the calculated time point, the battery to the maximum battery charge level, where the calculated time point is calculated such that the battery charges to the maximum battery charge level before the expiration of the predicted charge time duration.

According to an aspect, a system includes a battery configured to be charged by an external power source, a charging circuit coupled to the battery, and a battery charging manager configured to communicate with the charging circuit, where the battery charging manager configured to cause the charging circuit to permit a charging, over a first charging period, of the battery by the external power source to a temporary charge level below a maximum battery charge level, maintain, over a first relaxation period from the end of the first charging period to a calculated time point, the battery charge between the temporary charge level and a maintenance charge level lower than the temporary charge level, and permit a charging, over a second charging period starting from the calculated time point, of the battery by the external power source to the maximum battery charge level.

According to some aspects, the battery charging manager is configured to identify a predicted charge time duration from a predictive charge pattern, where the calculated time point is calculated such that the battery charges from the temporary charge level to the maximum battery charge level before the expiration of the predicted charge time duration.

According to some aspect, the battery charging manager is configured to calculate the calculated time point based on the predictive charge pattern.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A system comprising:
a battery configured to be charged by a power source;
a charging circuit coupled to the battery; and
a battery charging manager configured to communicate with the charging circuit to control a charging of the battery by the power source, the battery charging manager configured to obtain a charge pattern including an end charge time corresponding to a time when the battery is estimated to be disconnected from the power source,
the battery charging manager configured to control the charging circuit to:
charge, over a first charging period, the battery to a temporary charge level;
maintain, over a relaxation period, the battery charge level between the temporary charge level and a maintenance charge level; and
charge, over a second charging period after the relaxation period, the battery to a maximum battery charge level before the end charge time.

2. The system of claim 1, wherein the battery charging manager is configured to estimate a length of time to charge the battery to the maximum battery charge level, the battery charging manager configured to control the charging circuit in response to the estimated length of time being less than a predicted charge duration.

3. The system of claim 1, wherein the battery charging manager is configured to calculate a charge resume time and start the second charging period at the calculated charge resume time.

4. The system of claim 3, wherein the battery charging manager is configured to calculate the charge resume time using the end charge time and an estimated time duration to charge the battery from the temporary charge level to the maximum battery charge level.

5. The system of claim 1, wherein the battery charging manager is configured to adjust a value of the temporary charge level using a prediction confidence level associated with the charge pattern.

6. The system of claim 1, further comprising:
an application controller; and
an embedded controller, the embedded controller including the battery charging manager.

7. The system of claim 1, wherein the battery charging manager includes a prediction engine configured to compute the charge pattern, the prediction engine including a predictive model, the prediction engine configured to obtain one or more signals and input the signals to the predictive model to compute the charge pattern, the signals including charging history data and contextual data.

8. The system of claim 7, wherein the prediction engine is configured to compute the charge pattern before detection of a charging event and store the charge pattern in memory of the system, wherein the battery charging manager is configured to obtain the charge pattern from the memory in response to the detection of the charging event.

9. The system of claim 7, wherein the battery charging manager is configured to cause the prediction engine to compute the charge pattern in response to a detection of a charging event.

10. The system of claim 7, wherein the battery charging manager includes a predictive model trainer configured to train the predictive model using one or more machine-learning algorithms inputted with training data, wherein the prediction engine is configured to execute on a device, and the predictive model trainer is configured to execute on a server computer, wherein the prediction engine is configured to receive, over a network, information related to the predictive model from the predictive model trainer.

11. A method comprising:
computing a charge pattern based on charging history data and contextual data, the charge pattern including an end charge time corresponding to a time when a battery of a device is estimated to be disconnected from a power source;
calculating a charge resume time using the charge pattern; and
controlling a charging of the battery using the end charge time and the charge resume time, including:
charging, over a first charging period, the battery to a temporary charge level;
maintaining, over a relaxation period, the battery charge level between the temporary charge level and a maintenance charge level; and
charging, over a second charging period starting at the charge resume time, the battery to a maximum battery charge level before the end charge time.

12. The method of claim 11, further comprising:
storing the charge pattern in memory of the device;
obtaining the charge pattern in response to detection of a charging event of a current charge cycle; and
determining that the current charge cycle relates to the charge pattern.

13. The method of claim 11, wherein the charge pattern is computed in response to detection of a charging event.

14. The method of claim 11, further comprising:
computing a value for the temporary charge level.

15. The method of claim 11, further comprising:
estimating a length of time to charge the battery to the maximum battery charge level; and
controlling the charging of the battery in response to the estimated length of time being less than a predicted charge duration, the predicted charge duration being defined from a time of detecting of a charging event to the end charge time.

16. The method of claim 11, further comprising:
obtaining one or more signals related to the charging history data and the contextual data;
inputting the signals to a predictive model to compute the charge pattern;
re-training the predictive model using one or more machine-learning algorithms inputted with training data to obtain updated weight and bias information; and
updating the predictive model with the updated weight and bias information.

17. A non-transitory computer-readable medium storing executable instructions that when executed by a processor cause the processor to:
compute a charge pattern based on charging history data and contextual data, the charge pattern having an estimated charge duration during which a device having a battery is estimated to be coupled to a power source;
adjust a charging of the battery in response to the estimated charge duration being greater than an estimated time to charge the battery to a maximum battery charge level, including:
charge, over a first charging period, the battery to a temporary charge level;
maintain, over a relaxation period, the battery charge level between the temporary charge level and a maintenance charge level; and
charge, over a second charging period after the relaxation period, the battery towards the maximum battery charge level.

18. The non-transitory computer-readable medium of claim 17, wherein the charge pattern includes a predicted end charge time of when the battery is predicted to be disconnected from the power source, wherein the battery is charged to the maximum battery charge level before the predicted end charge time during the second charging period.

19. The non-transitory computer-readable medium of claim 17, further comprising:
increase a value of the temporary charge level in response to a prediction confidential level being less than a threshold level.

20. The non-transitory computer-readable medium of claim 17, further comprising:
store the charge pattern in memory;
detect a charging event;
obtain the charge pattern from the memory.

21. A non-transitory computer-readable medium storing executable instructions that when executed by a processor cause the processor to execute operations, the operations comprising:
obtain a charge pattern including an end charge time corresponding to a time when a battery of a computing device is estimated to be disconnected from a power source; and
control a charging of the battery, including:
charge, over a first charging period, the battery to a temporary charge level;
maintain, over a relaxation period, the battery charge level between the temporary charge level and a maintenance charge level; and
charge, over a second charging period after the relaxation period, the battery to a maximum battery charge level before the end charge time.

22. The non-transitory computer-readable medium of claim 21, wherein the operations comprise:
adjust a value of the temporary charge level using a prediction confidence level associated with the charge pattern.

* * * * *